(12) United States Patent
Arakane

(10) Patent No.: US 10,596,824 B2
(45) Date of Patent: Mar. 24, 2020

(54) IMAGE RECORDING APPARATUS

(71) Applicant: BROTHER KOGYO KABUSHIKI KAISHA, Nagoya-shi, Aichi-ken (JP)

(72) Inventor: Satoru Arakane, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/260,700

(22) Filed: Jan. 29, 2019

(65) Prior Publication Data

US 2019/0232679 A1     Aug. 1, 2019

(30) Foreign Application Priority Data

Jan. 31, 2018   (JP) .................... 2018-014424

(51) Int. Cl.
   *B41J 2/21*    (2006.01)
   *G06K 15/10*    (2006.01)

(52) U.S. Cl.
   CPC .......... *B41J 2/2132* (2013.01); *G06K 15/107* (2013.01)

(58) Field of Classification Search
   CPC .................... B41J 2/2132; G06K 15/107
   See application file for complete search history.

(56) References Cited

U.S. PATENT DOCUMENTS

| | | | |
|---|---|---|---|
| 5,847,721 A | 12/1998 | Ogata et al. | |
| 6,145,960 A * | 11/2000 | Kanda | B41J 2/2132 347/16 |
| 2002/0154182 A1 * | 10/2002 | Takahashi | B41J 2/2132 347/12 |
| 2009/0251499 A1 | 10/2009 | Santo et al. | |
| 2010/0110116 A1 * | 5/2010 | Kobayashi | B41J 2/2132 347/1 |
| 2016/0089908 A1 * | 3/2016 | Matsuura | B41J 2/145 347/16 |
| 2016/0243862 A1 | 8/2016 | Yoshida | |
| 2018/0229509 A1 * | 8/2018 | Kondo | B41J 5/30 |

FOREIGN PATENT DOCUMENTS

| | | |
|---|---|---|
| JP | H08-244253 A | 9/1996 |
| JP | 2009-241281 A | 10/2009 |
| JP | 2016-153182 A | 8/2016 |

* cited by examiner

*Primary Examiner* — Julian D Huffman
(74) *Attorney, Agent, or Firm* — Scully, Scott, Murphy & Presser, PC

(57) ABSTRACT

There is provided an image recording apparatus including: a conveyer, a carriage moving in a scanning direction, a recording head, and a controller. When the controller has not detected that image data of a line image corresponding to one line that extends in the scanning direction is present at an upstream end in a conveyance direction of the recording area for a next recording pass, the controller makes a conveyance amount of the recording medium in the conveyance operation between a certain recording pass and the next recording pass smaller than a case in which the controller has detected that the image data of the line image is present at the upstream end in the conveyance direction of the recording area for the next recording pass, by a predefined amount.

8 Claims, 15 Drawing Sheets

SCANNING
DIRECTION
LEFT ↔ RIGHT
↓ CONVEYANCE
DIRECTION

SCANNING
DIRECTION
LEFT ←→ RIGHT
↓ CONVEYANCE
DIRECTION

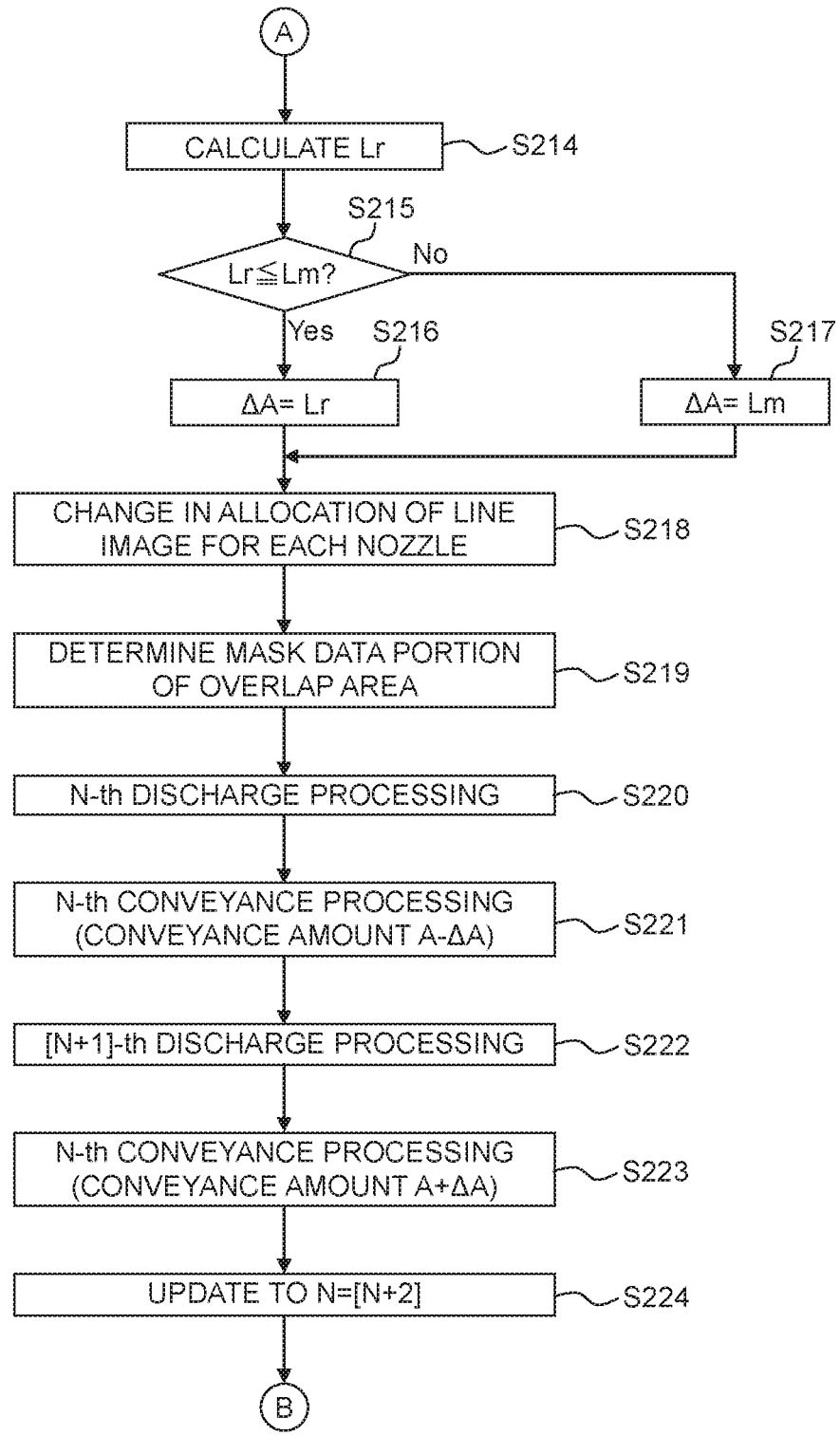

IMAGE RECORDING APPARATUS

CROSS REFERENCE TO RELATED APPLICATION

The present application claims priority from Japanese Patent Application No. 2018-014424 filed on Jan. 31, 2018, the disclosure of which is incorporated herein by reference in its entirety.

BACKGROUND

Field of the Invention

The present disclosure is related to an image recording apparatus configured to record an image on a recording medium.

Description of the Related Art

As an exemplary image recording apparatus that records an image, there is publicly known a recording apparatus that records an image by discharging ink from nozzles. The publicly known recording apparatus performs recording on recording paper by repeatedly and alternatingly performing recording of a band in which ink is discharged from nozzles during movement of a recording head in a scanning direction, and conveyance of recording paper in a sub-scanning direction. In the above recording apparatus, the recording paper is conveyed in the sub-scanning direction so that ends of two bands closest to each other overlap with each other by multiple lines in the sub-scanning direction, and the respective lines where the two bands overlap with each other are recorded by using two different nozzles. Performing recording as above can reduce or eliminate a white streak and unevenness in concentration (density) at a boundary between the bands due to variation in conveyance amounts of recording paper.

SUMMARY

In the above recording apparatus, when the number of lines to be recorded in an area where two bands overlap with each other is small, and when the conveyance amount of recording paper varies greatly, a white streak and unevenness in concentration may occur. It is possible for the above recording apparatus to reduce or eliminate the white streak and unevenness in concentration by increasing the number of lines to be recorded in the area where two bands overlap with each other, when variation in the conveyance amounts of the recording paper is slightly large. In that case, however, the number of bands required to record an image on recording paper increases, which may lengthen recording time.

An object of the present disclosure is to provide an image recording apparatus capable of reducing or eliminating a white streak and unevenness in concentration (density) due to variation in conveyance amounts of a recording medium without lengthening recording time.

According to an aspect of the present disclosure, there is provided an image recording apparatus, including: a conveyer configured to convey a recording medium in a conveyance direction; a carriage configured to move in a scanning direction orthogonal to the conveyance direction; a recording head carried on the carriage and including a nozzle row that has a plurality of nozzles aligned in the conveyance direction; and a controller configured to control the conveyer, the carriage and the recording head to record an image on the recording medium by alternately performing a recording pass in which liquid is discharged from the nozzles to the recording medium during movement in the scanning direction of the carriage, and a conveyance operation in which the conveyer conveys the recording medium in the conveyance direction. In a case of recording the image, in a case that the recording medium is conveyed by the conveyance operation and that the recording pass is performed twice successively to record the image on two recording areas of the recording medium so that the two recording areas partially overlap with each other, the controller is configured to control the recording head to record a thinned-out image by recording a line image corresponding to one line that extends in the scanning direction in an overlap area where the two recording areas overlap with each other by use of the nozzles different from each other between the two successive recording passes and causing different parts of the line image to be thinned out based on mask data. The controller is configured to detect whether or not image data of the line image is present in the recording area for a next recording pass of a certain recording pass in an order starting from a downstream end in the conveyance direction. In a case that the controller has not detected that the image data of the line image is present at an upstream end in the conveyance direction of the recording area for the next recording pass, the controller is configured to make a conveyance amount of the recording medium in the conveyance operation between the certain recording pass and the next recording pass smaller than a case in which the controller has detected that the image data of the line image is present at the upstream end in the conveyance direction of the recording area for the next recording pass, by an amount corresponding to a length in the conveyance direction that is equal to or less than a length between the upstream end of the recording area for the next recording pass and a most upstream position of the recording area where the image data of the line image is detected. The controller is configured control the conveyer, the carriage and the recording head to perform recording on the overlap area corresponding to the certain recording pass and the next recording pass by recording the thinned-out image.

In the present disclosure, the controller detects whether the image data of the line image is present in the recording area for the next recording pass of the certain recording pass in the order starting from the downstream end in the conveyance direction. When the image data of the line image is not detected at the upstream end in the conveyance direction of the recording area for the next recording pass, the conveyance amount of the recording medium in the conveyance operation between the certain recording pass and the next recording pass is made to be smaller than the case in which the image data of the line image is detected at the upstream end in the conveyance direction of the recording area for the next recording pass, by the amount corresponding to the length in the conveyance direction that is equal to or less than the length between the upstream end of the recording area for the next recording pass and the most upstream position of the recording area where the image data of the line image is detected.

In the above configuration, when the image data of the line image is not detected at the upstream end of the recording area for the next recording pass, the length in the conveyance direction of the overlap area corresponding to the certain recording pass and the next recording pass is lengthened. This can eliminate or reduce a white streak and unevenness in concentration due to variation in the conveyance amounts of the recording medium. Further, in the above configuration, a conveyance amount in the conveyance operation between the certain recording pass and a recording pass immediately before the certain recording pass is reduced by an amount corresponding to a length that is equal to or less than a length (length of a blank section), which is equal to or less than the length between the upstream end of the recording area for the next recording pass and the most upstream position of the recording area where the image data of the line image is detected. Thus, image recording can be performed by making a conveyance amount in the conveyance operation immediately after the next recording pass large, which prevents an increase in a recording pass count required for image recording.

BRIEF DESCRIPTION OF THE DRAWINGS

FIGS. 9A to 9C are illustrative views each depicting actual mask data and a correspondence relation between the actual mask data and the reference mask data, wherein FIG. 9A depicts a case in which line images of two lines overlap with each other by two recording passes. FIG. 9B depicts a case in which line images of three lines overlap with each other by two recording passes, and FIG. 9C depicts a case in which line images of four lines overlap with each other by two recording passes.

FIGS. 10A and 10B indicate a flowchart according to a first modified embodiment which corresponds to FIGS. 3A and 3B.

DESCRIPTION OF THE EMBODIMENTS

In the following, an embodiment of the present disclosure is explained.

<Configuration of Printer>

Figure 1:
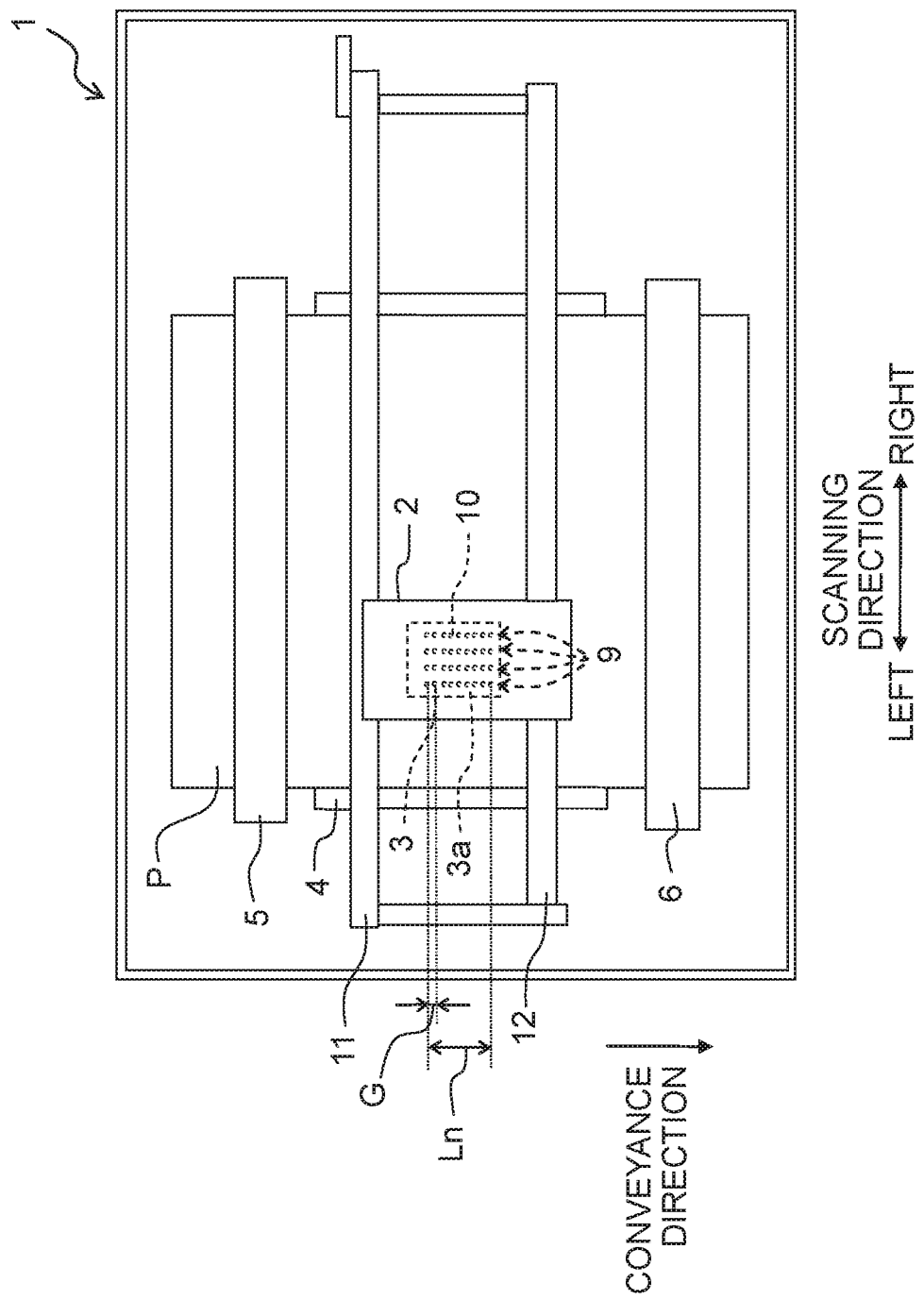
FIG. 1 is a schematic configuration view of a printer according to an embodiment of the present disclosure.

As depicted in FIG. 1, a printer 1 according to this embodiment (an image recording apparatus of the present disclosure) includes a carriage 2, an ink-jet head 3 (a recording head of the present disclosure), a platen 4, and conveyance rollers 5 and 6 (a conveyer of the present disclosure).

The carriage 2 is supported by two guide rails 11 and 12 extending in a scanning direction. The carriage 2 is connected to a carriage motor 56 (see FIG. 2) via a belt (not depicted) or the like. Driving the carriage motor 56 moves the carriage 2 in the scanning direction along the guide rails 11 and 12. In the following, right and left sides in FIG. 1 are defined as right and left sides in the scanning direction.

The ink-jet head 3 is carried on the carriage 2. The ink-jet head 3 discharges ink from nozzles 10, which are formed on a lower surface 3a of the ink-jet head 3. The nozzles 10 are arrayed in a conveyance direction at fixed nozzle intervals G to form nozzle rows 9. The conveyance direction is orthogonal to the scanning direction. Each nozzle row 9 has a length Ln in the conveyance direction. The ink-jet head 3 includes four nozzle rows 9 arranged in the scanning direction. Black ink is discharged from nozzles 10 belonging to the rightmost nozzle row 9 in the scanning direction, yellow ink is discharged from nozzles 10 belonging to the second rightmost nozzle row 9 in the scanning direction, cyan ink is discharged from nozzles 10 belonging to the third rightmost nozzle row 9 in the scanning direction, and magenta ink is discharged from nozzles 10 belonging to the leftmost nozzle row 9 in the scanning direction.

The platen 4, which is disposed below the ink-jet head 3, faces the ink-jet head 3. The platen 4 extends across the entire length of the recording paper P in the scanning direction and supports the recording paper P from below. The conveyance rollers 5 and 6 extend in the scanning direction. The conveyance roller 5 is disposed on the upstream side of the ink-jet head 3 in the conveyance direction, and the conveyance roller 6 is disposed on the downstream side of the ink-jet head 3 in the conveyance direction. The conveyance rollers 5 and 6 are connected to a conveyance motor 57 (see FIG. 2) via a gear (not depicted) or the like. Driving the conveyance motor 57 rotates the conveyance rollers 5 and 6, which conveys the recording paper P in the conveyance direction.

The printer 1 records an image on the recording paper P by alternatingly performing a recording pass and a conveyance operation. In each recording pass, ink is discharged from nozzles 10 of the ink-jet head 3 to the recording paper P during movement of the carriage 2 in the scanning direction. In each conveyance operation, the recording paper P is conveyed in the conveyance direction by use of the conveyance rollers 5 and 6. The printer 1 can record an image by selectively using any of a bidirectional recording mode and a unidirectional recording mode. The bidirectional recording mode is a printing mode in which ink is discharged from nozzles 10 both when the carriage 2 moves leftward in the scanning direction (one side of the present disclosure) and when the carriage 2 moves rightward in the scanning direction (the other side of the present disclosure). The unidirectional recording mode is a printing mode in which ink is discharged from nozzles 10 only when the carriage 2 moves leftward or rightward in the scanning direction (one side of the present disclosure).

In this embodiment, in both of the bidirectional recording mode and the unidirectional recording mode, the conveyance amount of the recording sheet P is adjusted so that recording areas recorded by two successive recording passes partially overlap each other, as described below. This reduces or eliminates a white streak and unevenness in concentration (density) at a boundary between the recording area by a certain recording pass and the recording area by the next recording pass. However, when the overlap portion where the recording areas overlap with each other includes a line in which no ink is discharged, the white streak would inevitably appear whether or not the recording areas overlap with each other. The effect of reducing or eliminating the white streak and unevenness in concentration in the line where no ink is discharged is thus not expected even when the recording areas overlap with each other. In view of the above, inventors of the present disclosure have developed the printer 1 of the present disclosure by making the overlap portion of the recording areas that includes the line where no ink is discharged small, and making the overlap portion of the recording areas that includes the line where ink is discharged large.

<Electrical Configuration of Printer>

Figure 2:
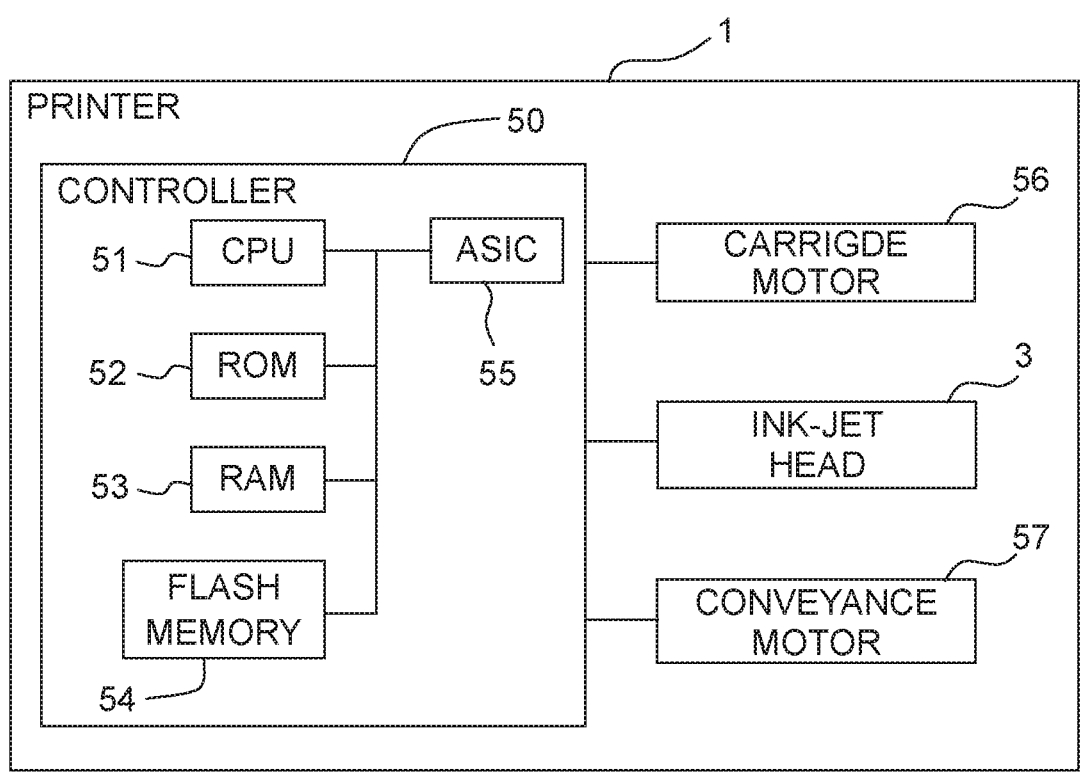
FIG. 2 is a block diagram of an electrical configuration of the printer.

Next, an electrical configuration of the printer 1 is explained. As depicted in FIG. 2, the printer 1 includes a controller 50. The controller 50 includes a Central Processing Unit (CPU) 51, a Read Only Memory (ROM) 52, a Random Access Memory (RAM) 53, a flash memory 54, an Application Specific Integrated Circuit (ASIC) 55, and the like. The controller controls operations of the carriage motor 56, the ink-jet head 3, the conveyance motor 57, and the like.

In the controller 50, only the CPU 51 may perform various kinds of processing, only the ASIC 55 may perform various kinds of processing, the CPU 51 may cooperate with the ASIC 55 to perform various kinds of processing. In the controller 50, the CPU 51 may perform a piece of processing alone, or pieces of the CPU 51 may perform a piece of processing in a shared fashion. Or, the ASIC 55 may perform a piece of processing alone, or pieces of the ASIC 55 may perform a piece of processing in a shared fashion.

<Control in Recording>

Subsequently, control of the controller 50 when the printer 1 records an image on the recording paper P is explained. In this embodiment, when a recording command based on which the printer 1 performs printing is input to the printer 1, the controller 50 records an image on the recording paper P by performing pieces of processing in accordance with the flowchart of FIGS. 3A and 3B.

Figure 3A:
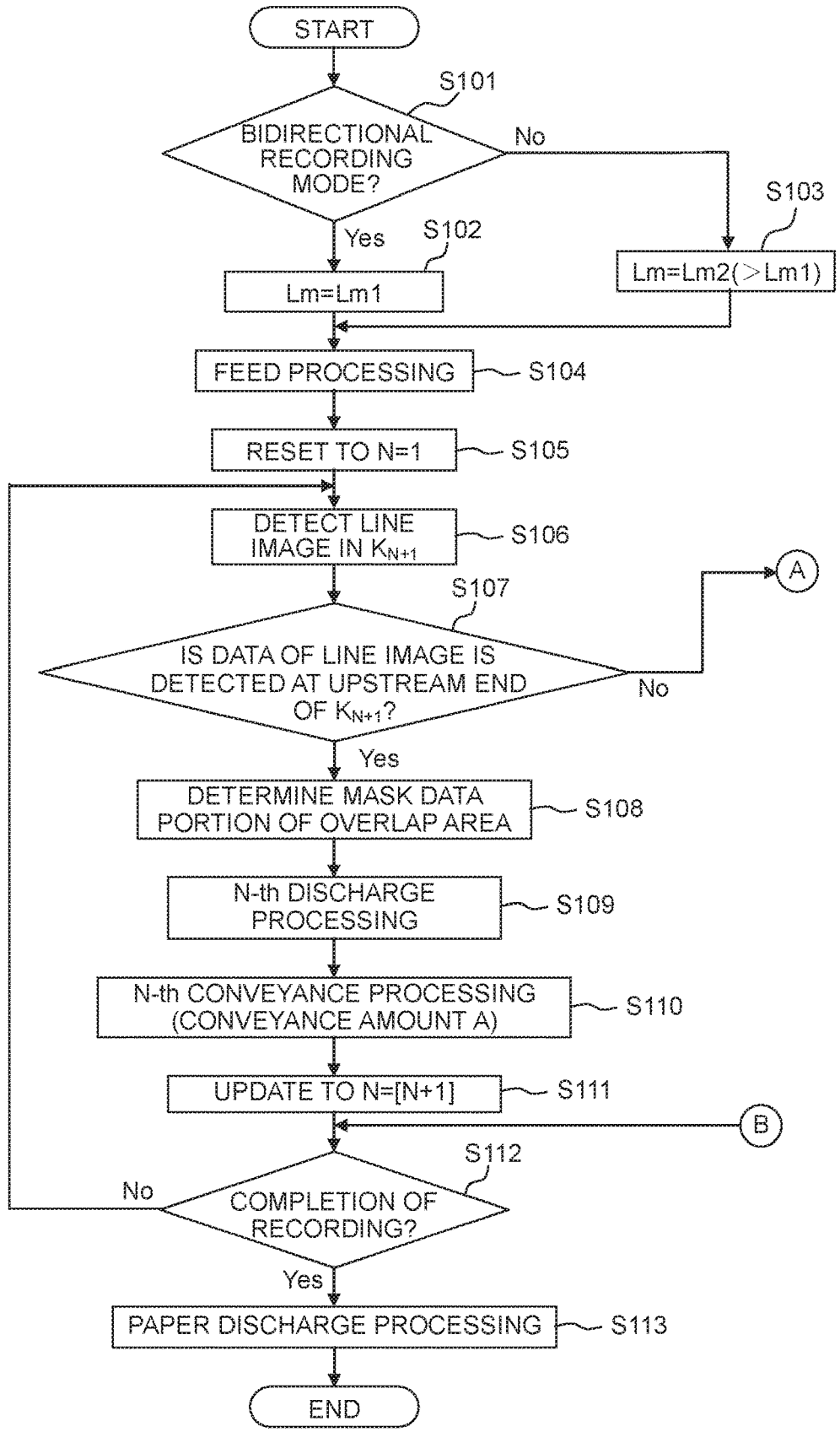
FIGS. 3A and 3B indicate a flowchart of recording processing.

As indicated in FIG. 3A, the controller 50 determines which one of the bidirectional recording mode and the unidirectional recording mode is used for recording (S101). In the step S101, the controller 50 performs the determination based on, for example, a signal that is inputted together with the recording command and indicates which one of the recording modes is used for recording. Alternatively, the controller 50 performs the determination based on image data inputted together with the recording command. When the bidirectional recording mode is used for recording (S101: YES), an upper limit value Lm to be used for determination in S115 described below is set as a value Lm1 (S102). When the unidirectional recording mode is used for recording (S101: NO), the upper limit value Lm is set as a value Lm2 (>Lm1) (S103). Each of the values Lm1 and Lm2 is a length that is natural number times as long as the interval G between nozzles 10 of each of the nozzle rows 9.

Subsequently, the controller 50 controls a feed mechanism (not depicted) to perform feed processing for supplying the recording paper P (S104). In the step S104, the recording paper P is supplied to a position where the first recording pass is performed. Next, the controller 50 resets a variable N to one (S105).

Subsequently, the controller 50 detects, based on image data of an image to be recorded, whether image data of a line image T is present in a recording area $K_{N+1}$ of the recording paper P where the image is to be recorded by the [N+1]-th recording pass, in an order starting from a downstream end in the conveyance direction (S106). In this embodiment, the N-th recording pass corresponds to a certain recording pass of the present disclosure, and the [N+1]-th recording pass corresponds to a next recording pass of the present disclosure. In the following, when the recording area is distinguished based on which the image is recorded by what-numbered recording pass, similarly to the above, the recording area in which the image is recorded by the N-th recording pass is referred to as, for example, a recording area $K_N$. When the recording area is not distinguished based on which the image is recorded by what-numbered recording pass, the recording area is referred to as a recording area K.

Figure 4A:
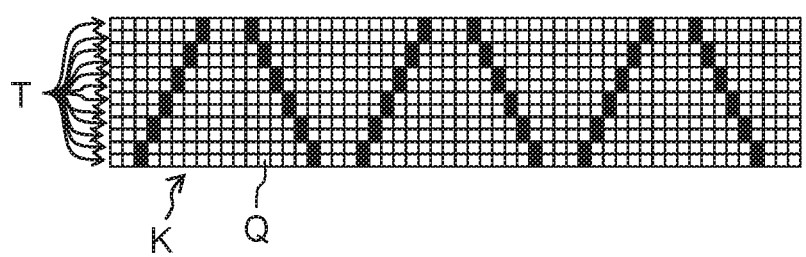
FIG. 4A depicts an exemplary recording area when image data of a line image is detected at an upstream end of the recording area.
Figure 4B:
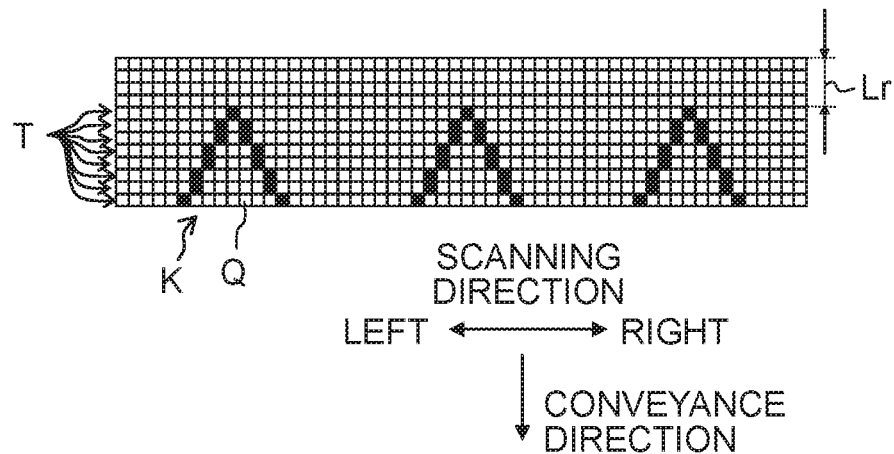
FIG. 4B depicts an exemplary recording area where the image data of the line image is not detected at the upstream end of the recording area.

The image to be recorded in the recording area K by the recording pass is, for example, an image configured by dots Q arranged in the scanning direction and the conveyance direction, such as those depicted in FIGS. 4A and 4B. The line image T, which is configured by dots Q arrayed in the scanning direction, is an image portion corresponding to one line that extends in the scanning direction. In the recording pass, one line image T is allocated for each nozzle 10. In FIGS. 4A and 4B, black solid sections indicate that dots Q are present, and white blank sections indicate that no dots Q are present. In S106, when at least one dot Q is present in each line of the recording area $K_{N+1}$, the image data of the line image T is detected. When no dot Q is present in each line of the recording area $K_{N+1}$, the image data of the line image T is not detected.

Subsequently, the controller 50 determines, based on the detection result in the step S106, whether the image data of the line image T is detected at an upstream end in the conveyance direction of the recording area $K_{N+1}$ (S107). For example, when the image to be recorded in the recording area $K_{N+1}$ is an image as depicted in FIG. 4A, the controller 50 determines that the image data of the line image T is detected at the most upstream end in the conveyance direction. When the image to be recorded in the recording area $K_{N+1}$ is an image as depicted in FIG. 4B, the controller 50 determines that the image data of the line image is not detected at the most upstream end in the conveyance direction.

Figure 5:
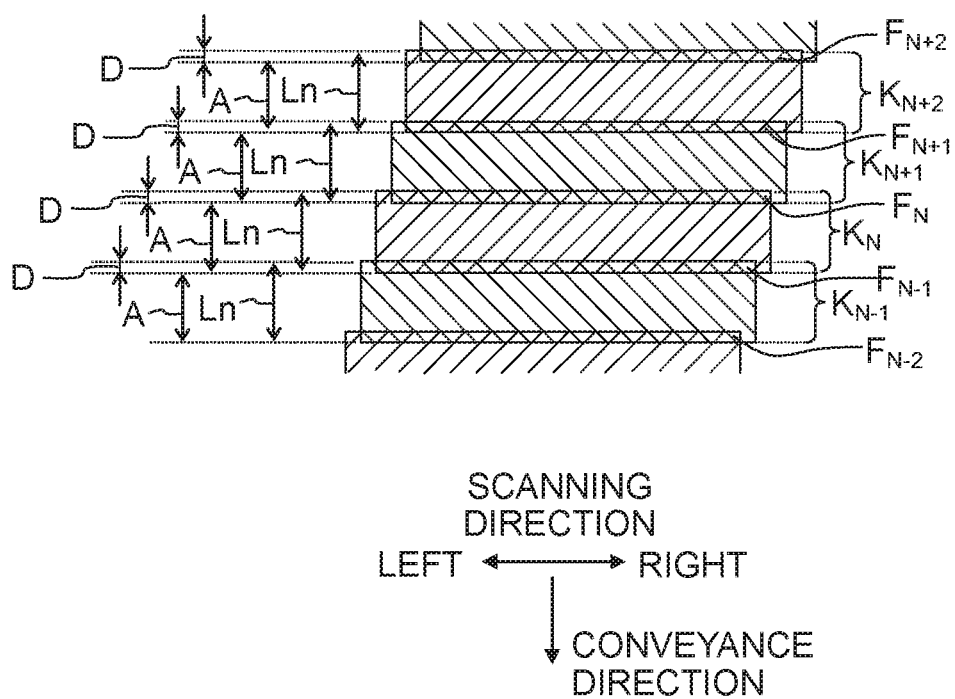
FIG. 5 is an illustrative view of an image to be recorded when the image data of the line image is detected at the upstream end of the recording area.

When the image data of the line image T is detected at the upstream end in the conveyance direction of the recording area $K_{N+1}$ (S107: YES), the controller 50 determines a data portion (hereinafter may be referred to as a mask data portion corresponding to an overlap area $F_N$) that is included in mask data for the recording area $K_N$ and the recording area $K_{N+1}$ and corresponds to the overlap area $F_N$ where the recording areas overlap with each other (S108). The mask data is data indicating whether ink discharge (dot formation) is allowed or ink discharge is prohibited (dots are thinned) at each position in the scanning direction when recording is performed in the recording area K, as described below. Here, as depicted in FIG. 5, the image to be recorded includes overlap areas. When explanation is made by distinguishing each of the overlap areas, the overlap area is referred to as, for example, an overlap area $F_N$. When explanation is made without distinguishing each of the overlap areas, the overlap area is referred to as an overlap area F. Although the recording areas K have the same position in the scanning direction in reality, the recording areas K in FIG. 5 have mutually different positions in the scanning direction for the purpose of depicting the overlap areas F clearly. The same is true of FIGS. 6A and 6B, FIGS. 7A and 7B, and FIG. 13.

Subsequently, the controller 50 performs the N-th discharge processing (S109). In the step S109, the image is recorded in the recording area $K_N$ by controlling the carriage motor 56 and the ink-jet head 3 to perform the N-th recording pass. Then, the controller 50 performs the N-th conveyance processing (S110). In S110, the conveyance operation is performed by controlling the conveyance motor 57 to cause the conveyance rollers 5 and 6 to convey the recording paper P by a predefined conveyance amount A.

The predefined conveyance amount A is a conveyance amount corresponding to a length [Ln−D], which is shorter than the length Ln of the nozzle row 9 by a length D. In this configuration, when the recording paper P is conveyed by the predefined conveyance amount A in the conveyance operation performed between two successive recording passes, the length in the conveyance direction of the overlap area F is the length D, as depicted in FIG. 5.

In the recording pass of the step S109, ink is discharged from each nozzle 10 corresponding to an area that is included in the recording area $K_N$ and different from the overlap area F so that the line image T allocated for each nozzle 10 is recorded. Further, ink is discharged from each nozzle 10 corresponding to the overlap area F based on the mask data portion of the overlap area $F_N$ determined in S108 so that a thinned-out image, in which part of the line image T allocated for each nozzle 10 is thinned out, is recorded. In S108, the controller 50 determines the mask data portion of the overlap area $F_N$ when the overlap area $F_N$ has the length D. The thinned-out image and mask data are explained below in detail.

After the conveyance processing of the step S110, the controller 50 updates the variable N to [N+1] (S111). When recording of the image on the recording paper P is completed (S112: YES), the controller 50 controls the conveyance motor 57 to perform paper discharge processing in which the recording paper P is discharged by use of the conveyance rollers 5 and 6 (S113). Then, the controller 50 ends the series of processing indicated in FIGS. 3A and 3B. When recording of the image on the recording paper P is not completed (S112: NO), the controller 50 returns to the step S106.

When the image data of the line image T is not detected at the upstream end in the conveyance direction of the recording area $K_{N+1}$ (S107: NO), the controller 50 calculates a length Lr in the conveyance direction between the upstream end of the recording area $K_{N+1}$ and the most upstream position of the recording area $K_{N+1}$ where the image data of the line image T is detected, as depicted in FIG. 4B (S114). Specifically, the length Lr is calculated as [H−J]×G, when the number of lines in one recording area K is H and when the J-th line image T (J=1, 2, . . . , [H−1]) from the downstream side in the conveyance direction is the most upstream line image T in the conveyance direction of the recording area $K_{N+1}$. Namely, the length Lr is a length that is natural number times as long as the interval G between nozzles 10 of each nozzle row 9.

When the length Lr is equal to or less than the upper limit value Lm set in the step S102 or S103 (S115: YES), a variation ΔA of the conveyance amount of the recording paper P to be used in the conveyance processing of S121 and S123 described below is set as the length Lr (S116). When the length Lr exceeds the upper limit value Lm (S115: NO), the variation ΔA of the conveyance amount is set as the upper limit value Lm (S117).

Subsequently, the controller 50 changes allocation of the line image T for each nozzle 10 in the [N+1]-th recording pass, based on the variation ΔA set in the step S116 or S117 (S118). Specifically, in the [N+1]-th recording pass, the line image T to be allocated for each nozzle 10 is shifted upstream in the conveyance direction by an amount corresponding to [ΔA/G].

Subsequently, the controller 50 determines the mask data portion of the overlap area $F_N$ based on the variation ΔA set in the step S116 or S117 (S119). In the step S119, the controller 50 determines the mask data portion of the overlap area $F_N$ when the length in the conveyance direction of the overlap area $F_N$ is [D+ΔA].

Subsequently, the controller 50 performs the N-th discharge processing (S120). In e step S120, the controller 50 records the image in the recording area $K_N$ by controlling the carriage motor 56 and the ink-jet head 3 to perform the N-th recording pass (S120). Subsequently, the controller 50 performs the N-th conveyance processing (S121). In the step S121, the controller 50 controls the conveyance motor 57 to convey the recording paper P in the conveyance direction by [A−ΔA].

Subsequently, the controller 50 performs the [N+1]-th discharge processing (S122). In the step S122, the controller 50 records the image in the recording area $K_{N+1}$ by controlling the carriage motor 56 and the ink-jet head 3 to perform the [N+1]-th recording pass. Subsequently, the controller 50 performs the [N+1]-th conveyance processing (S123). In the step S123, the controller 50 controls the conveyance motor 57 to convey the recording paper P in the conveyance direction by [A+ΔA].

In the recording passes in the steps S120 and S122, ink is discharged from each nozzle 10 corresponding to an area that is included in the recording area K and different from the overlap area F so that the line image T allocated for each nozzle 10 is recorded. Further, ink is discharged from each nozzle 10 corresponding to the overlap area F so that the thinned-out image, in which part of the line image T allocated for each nozzle 10 is thinned out, is recorded based on the mask data portion of the overlap area $F_N$ determined in the step S119.

After completion of the [N+1]-th conveyance processing in the step S123, the controller 50 updates the variable N to [N+2] (S124), and the controller 50 proceeds to the step S112.

In this embodiment, a combination of the discharge processing in the steps S109, S120, and S122 and the conveyance processing in the steps S110, S121, and 123 corresponds to recording processing of the present disclosure.

<Image to be Recorded>

Figure 3B:
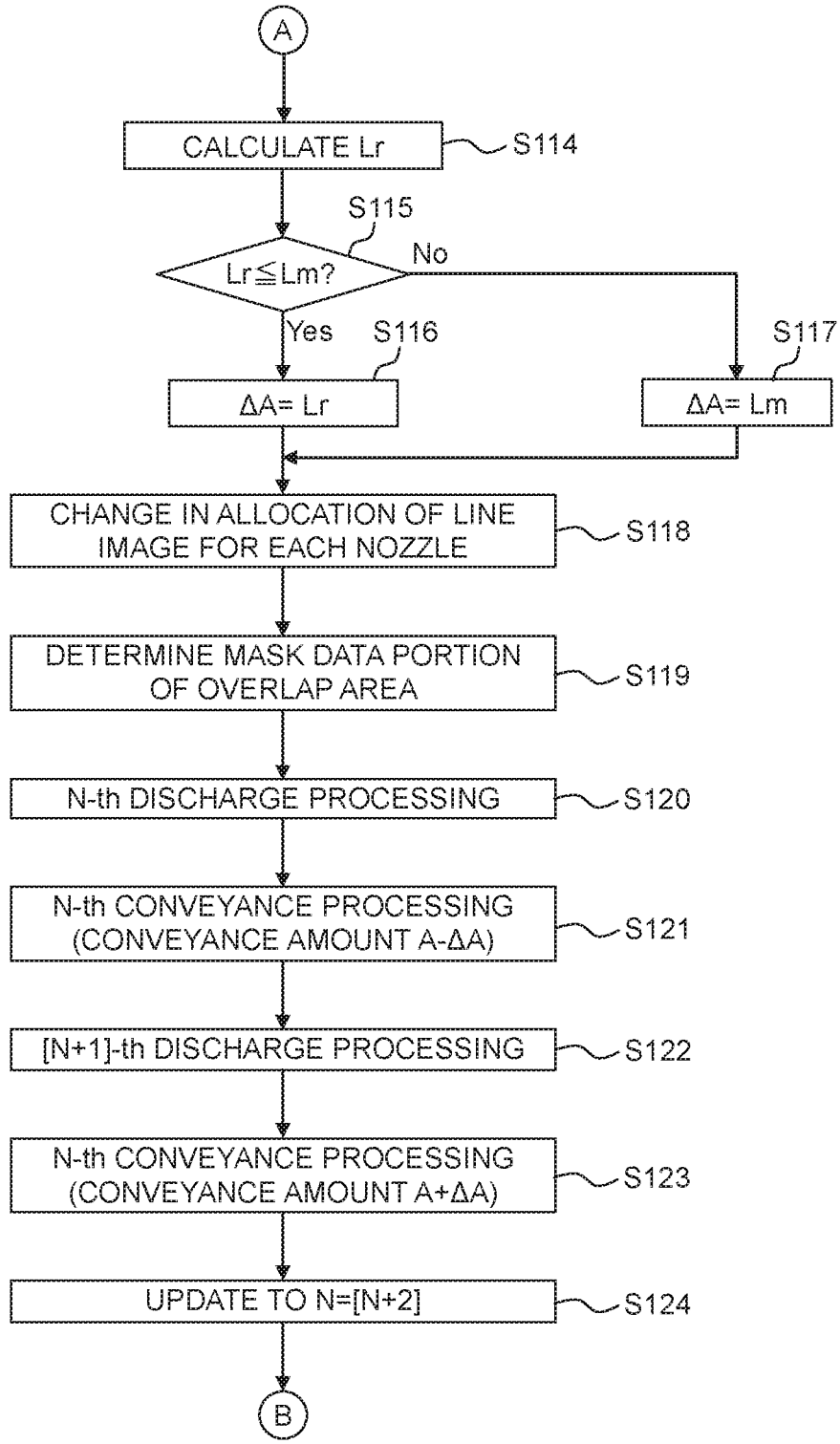

Subsequently, explanation is made about an image to be recorded by the printer 1 that performs control in accordance with the flowchart of FIGS. 3A and 3B. When the image data of the line image T is detected at the upstream ends in conveyance direction of all the recording areas K, the recording paper P is conveyed in all the conveyance operations by the predefined conveyance amount A. This makes the length in the conveyance direction of the overlap area F where recording areas K recorded by two successive recording passes overlap with each other, the length D, as depicted in FIG. 5.

Figure 6A:
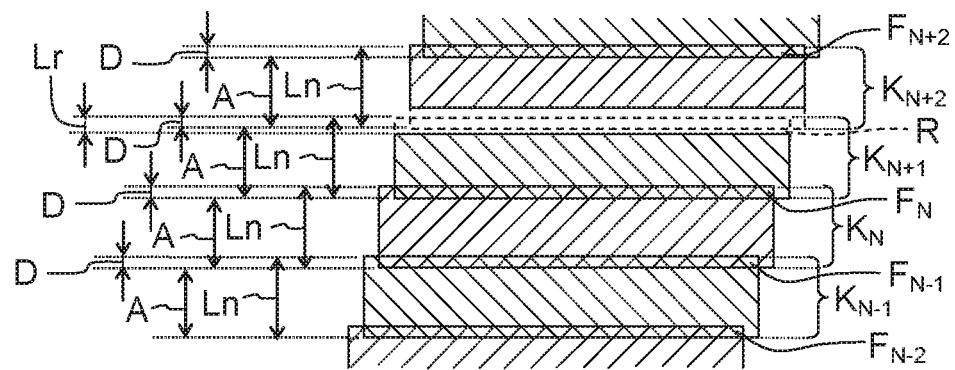
FIG. 6A is an illustrative view of an image to be recorded when the image data of the line image is not detected at the upstream end of the recording area and when conveyance amounts in all conveyance operations are set as a predefined conveyance amount with a length Lr being equal to or less than an upper limit value.
Figure 7A:
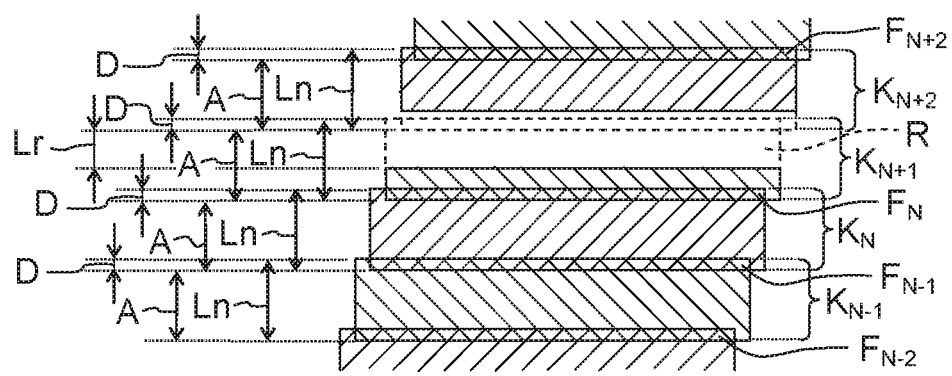
FIG. 7A is an illustrative view of an image to be recorded when the image data of the line image is not detected at the upstream end of the recording area and when the conveyance amounts in all conveyance operations are set as the predefined conveyance amount with the length Lr exceeding the upper limit value.

Unlike this embodiment, the conveyance amounts in all the conveyance operations may be determined as the predefined conveyance amount A, when the image data of the line image T is not detected at the upstream end in the conveyance direction of the [N+1]-th recording area $K_{N+1}$. In that case, as depicted in FIGS. 6A and 7A, a blank portion R where no image is recorded is present at the upstream end of the recording area $K_{N+1}$. The length of the blank portion R is the length Lr. FIG. 6A depicts a case in which the length Lr of the blank portion R is equal to or less than the upper limit value Lm. FIG. 7A depicts a case in which the length Lr of the blank portion R exceeds the upper limit value Lm.

Figure 6B:
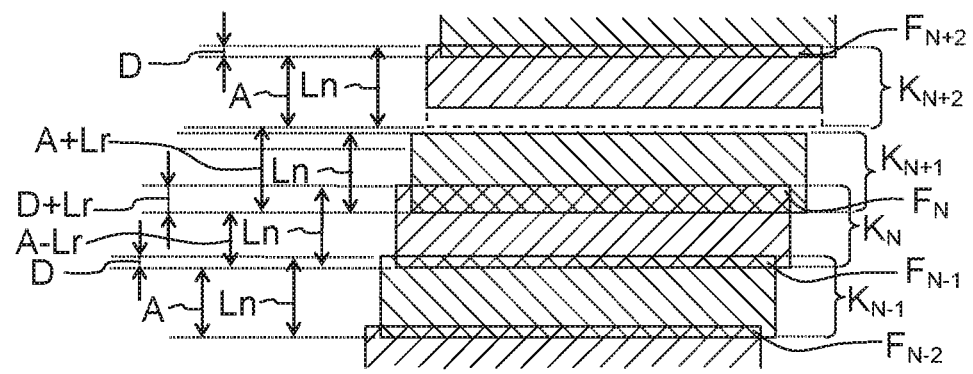
FIG. 6B is an illustrative view of an image to be actually recorded on a recording medium which corresponds to FIG. 5A.

In this embodiment, when the length Lr between the upstream end in the conveyance direction of the recording area $K_{N+1}$ and the most upstream position of the recording area $K_{N+1}$ where the image data of the line image T is detected is equal to or less than the upper limit value Lm, the conveyance amount of the recording paper P in the N-th conveyance operation (the conveyance operation performed between the N-th recording pass and the [N+1]-th recording pass) is determined as a conveyance amount [A−Lr], which is smaller than the predefined conveyance amount A by the length Lr. Corresponding to the above, allocation of the line image for each nozzle 10 in the [N+1]-th recording pass is changed. This makes the length in the conveyance direction of the overlap area F where the recording area $K_N$ and the recording area $K_{N+1}$ overlap with each other, a length [D+Lr] longer than the length D, as depicted in FIG. 6B. In that case, the length Lr of the blank portion R depicted in FIG. 6A corresponds to an increment in the length D of the overlap area F, and no blank portion R is present in the recording area $K_{N+1}$. Further, in that case, the conveyance amount of the recording paper P in the [N+1]-th conveyance operation is determined as a conveyance amount [A+Lr] larger than the predefined conveyance amount A by the length Lr. This makes the position in the conveyance direction of the recording area $K_{N+2}$ identical to the case depicted in FIG. 6A.

Figure 7B:
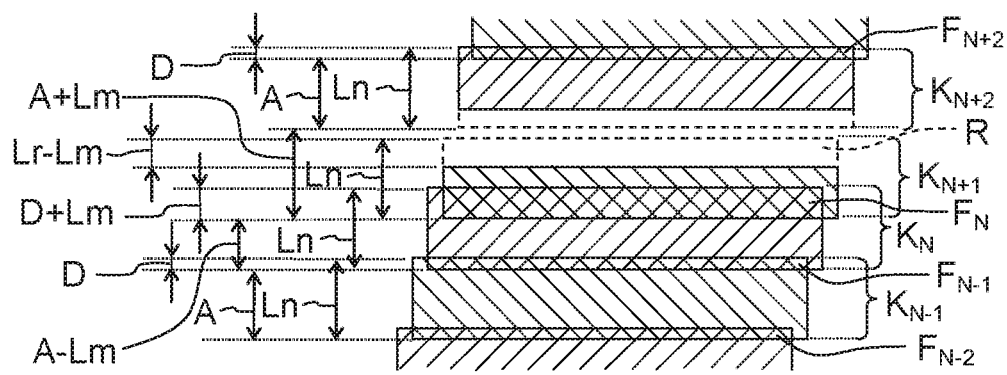
FIG. 7B is an illustrative view of an image to be actually recorded on the recording medium which corresponds to FIG. 7A.

When the length Lr exceeds the upper limit value Lm, the conveyance amount of the recording paper P in the N-th conveyance operation is determined as a conveyance amount [A−Lm] smaller than the predefined conveyance amount A by the upper limit value Lm. Corresponding to the above, allocation of the line image for each nozzle 10 in the [N+1]-th recording pass is changed. This makes the length in the conveyance direction of the overlap area F where the recording area $K_N$ and the recording area $K_{N+1}$ overlap with each other, a length [D+Lm] longer than the length D, as depicted in FIG. 7B. In that case, part of the length Lr in the conveyance direction of the blank portion R depicted in FIG. 7A corresponds to an increment in the length D of the overlap area F, and the length of the blank portion R in the recording area $K_N$ is determined as a length [Lr−Lm] shorter than the length Lr depicted in FIG. 7A by the length Lm. Further, in that case, the conveyance amount of the recording paper P in the [N+1]-th conveyance operation is determined as the conveyance amount [A+Lr] larger than the predefined conveyance amount A by the length Lr. This makes the position in the conveyance direction of the recording area $K_{N+2}$ identical to the case depicted in FIG. 6A.

<Multi-Pass Recording Processing>

As described above, in the overlap area F, the line image T corresponding to one line in the scanning direction is recorded through multi-pass recording in which the line image T is recorded by two successive recording passes. Mutually different nozzles 10 are used in the respective two recording passes to record thinned-out images, in which mutually different parts of the line image T are thinned out, based on the mask data portion included in the mask data and corresponding to the overlap area F. Accordingly, the line image T is completed in the overlap area F by causing the thinned-out images recorded by the respective two recording passes to overlap with each other.

<Mask Data>

The mask data used for the recording pass is explained. The flash memory 54 (a storage of the present disclosure) stores reference mask data U. The reference mask data U is mask data for the recording area K when the length in the conveyance direction is a length [Ln/2] that is half of the length Ln of the nozzle row 9.

Figure 8:
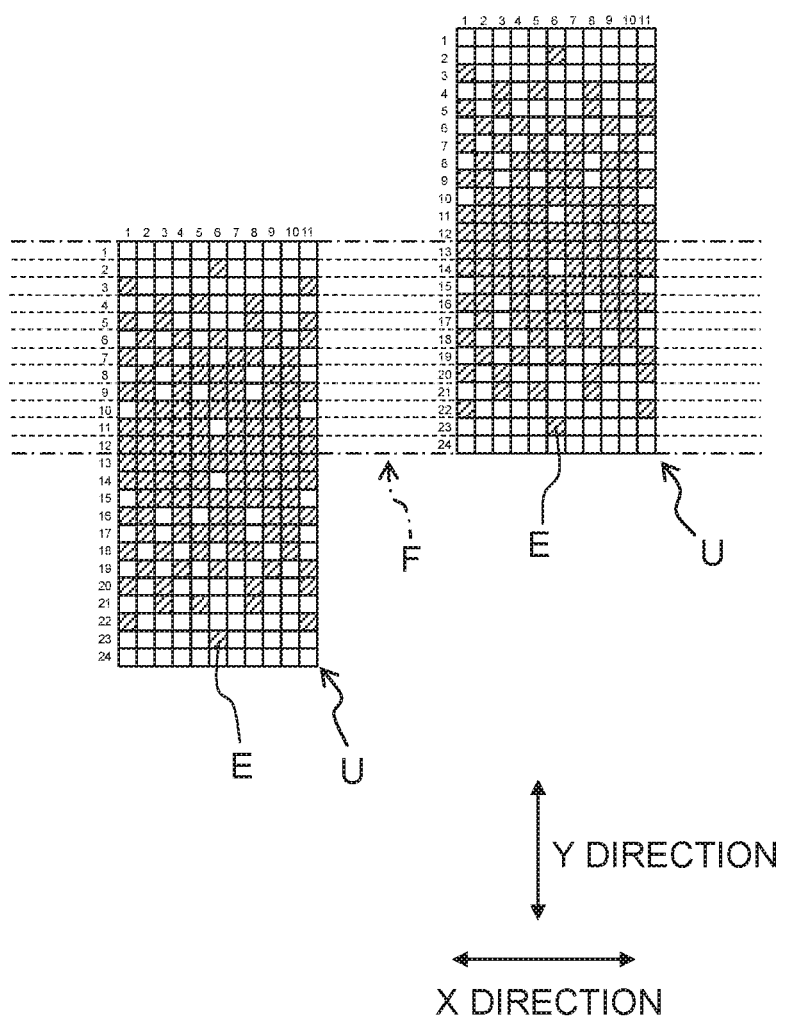
FIG. 8 is an illustrative view of reference mask data and a correspondence relation between the reference mask data and each overlap area.

The reference mask data U is formed by pieces of dot data E, as depicted in FIG. 8, arranged in a grid pattern in an X direction and a Y direction orthogonal to each other. For the sake of convenience, FIG. 8 depicts an example of the reference mask data U provided that 24 pieces of nozzle 10 (Ln=24×G) configure the nozzle row 9. The X direction is the scanning direction, and the Y direction is the conveyance direction. In FIG. 8, numbers 1, 2, 3, . . . 10, and 11 arranged in the X direction each correspond to what-numbered dot from the left side in the scanning direction of the line image. Specifically, the i-th (I=1, 2, . . . , 10, 11) dot data E from the left side in the X direction corresponds to [1+(11×C)]-th dot (C=0, 1, 2, . . . ) from the left side in the scanning direction of the line image. FIG. 8 depicts that numbers 1, 2, 3, . . . 23, and 24 arranged in the Y direction each correspond to what-numbered nozzle 10 from the upstream side in the conveyance direction. In FIG. 8, hatched dot data E indicates that ink discharge (dot formation) from the nozzle 10 is allowed, dot data E that is not hatched indicates that ink discharge from the nozzle 10 is prohibited (the dot is thinned out).

In the reference mask data U, rows of dot data E closer to the center portion in the Y direction include more pieces of dot data E allowing ink discharge (hatched dot data E). Further, in any two rows of dot data E, of the reference mask data U, separated from each other in the Y direction by 12 rows (e.g., a row 1 of dot data E and a row 13 of dot data E in the Y direction), an arrangement of the dot data E allowing ink discharge and an arrangement of the dot data E prohibiting ink discharge are opposite with each other. Thus, the line image is configured by overlapping the thinned-out image recorded by thinning the dot from the line image based on the one of the two rows of dot data E with the thinned-out image recorded by thinning the dot from the line image based on the other row of dot data E.

The length in the conveyance direction of the actual overlap area $F_N$ is shorter than the length [Ln/2] (=12×G) that is half of the length Ln of the nozzle row 9. Corresponding to this, in the multi-pass recording, data portions that are included in the mask data of the recording areas $K_N$ and $K_{N+1}$ and correspond to the overlap area $F_N$ are determined by using rows of dot data E that are included in multiple rows, of dot data E configuring the reference mask data U, every [(Ln/2/Lf)] row from the upstream side in the conveyance direction. More specifically, from among the rows of dot data E, those corresponding to a half on the upstream side in the conveyance direction are determined as data portions that are included in the mask data for the recording area $K_N$ and correspond to the overlap area $F_N$, and those corresponding to a half on the downstream side in the conveyance direction are determined as data portions that are included in the mask data for the recording area $K_{N+1}$ and correspond to the overlap area $F_N$.

Figure 9A:
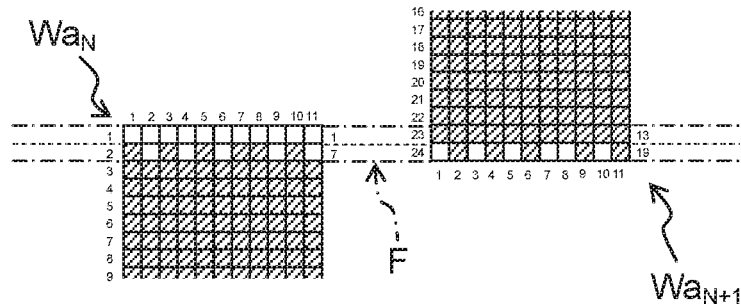

For example, when a length Lf of the overlap area $F_N$ is twice as long as the nozzle interval G, as depicted in FIG. 9A, two rows of dot data E on the upstream side in the conveyance direction, from among four rows of dot data E (e.g., first, seventh, thirteenth, and nineteenth rows of dot data E from the upstream side in the conveyance direction), of the reference mask data U, every six rows (=[12×G]/[2×G]) from the upstream side in the conveyance direction, are determined as data portions that are included in mask data $Wa_N$ for the recording area $K_N$ and correspond to the overlap area $F_N$. Further, two rows of dot data E on the downstream side in the conveyance direction from among the four rows of dot data E are determined as data portions that are included in mask data $Wa_{N+1}$ for the recording area $K_{N+1}$ and correspond to the overlap area $F_N$.

Figure 9B:
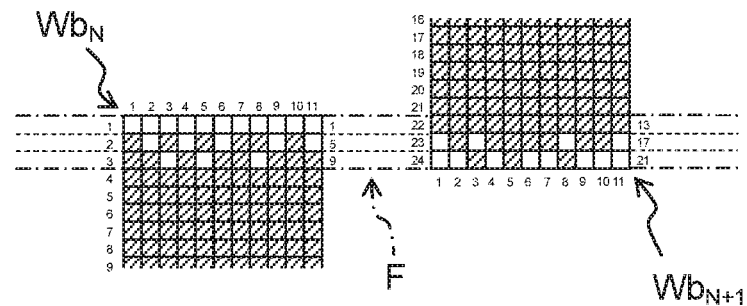

Similarly, for example, when the length of the overlap area F is three times as long as the nozzle interval G, as depicted in FIG. 9B, three rows of dot data E on the upstream side in the conveyance direction, from among six rows of dot data E (e.g., first, fifth, ninth, thirteenth, seventeenth, and twenty-first rows of dot data E from the upstream side in the conveyance direction), of the reference mask data U, every four rows (=[12×G]/[3×G]) from the upstream side in the conveyance direction, are determined as data portions which are included in mask data $Wb_N$ for the recording area $K_N$ and correspond to the overlap area $F_N$. Further, three rows of dot data F on the downstream side in the conveyance direction from among the six rows of dot data E are determined as data portions that are included in mask data $Wb_{N+1}$ for the recording area $K_{N+1}$ and correspond to the overlap area $F_N$.

Figure 9C:
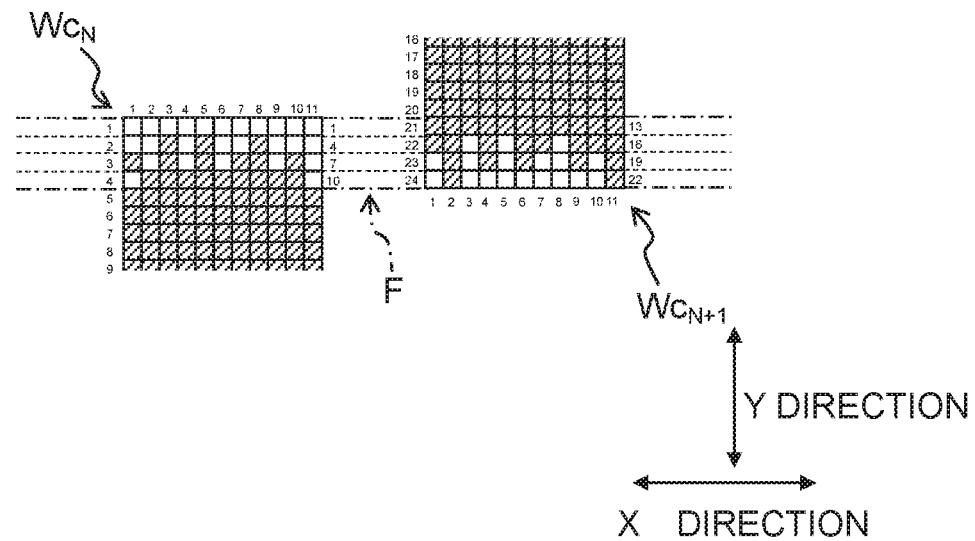

Similarly, when the length of the overlap area F is four times as long as the nozzle interval G, as depicted in FIG. 9C, four rows of dot data E on the upstream side in the conveyance direction, from among eight rows of dot data E (e.g., first, fourth, seventh, tenth, thirteenth, sixteenth, nineteenth, and twenty-second rows of dot data E from the upstream side in the conveyance direction), of the reference mask data U, every three rows (=[12×G]/[4×G]) from the upstream side in the conveyance direction, are determined as data portions that are included in mask data $Wc_N$ for the recording area $K_N$ and correspond to the overlap area $F_N$. Further, four rows of dot data E on the downstream side in the conveyance direction from among the eight rows of dot data F are determined as data portions that are included in mask data $Wc_{N+1}$ for the recording area $K_{N+1}$ and correspond to the overlap area $F_N$.

As depicted in FIGS. 9A to 9C, data portions of the mask data that are included in the recording area K and correspond to areas except for the overlap area F are formed by rows of dot data E (hatched dot data) in which all pieces of dot data E allow ink discharge.

Numbers 1 to 24 indicated on the left side of the mask data $Wa_N$, $Wa_{N+1}$, $Wb_N$, $Wb_{N+1}$, $Wc_N$, and $Wc_{N+1}$ in FIGS. 9A to 9C each indicate that the mask data corresponds to what-numbered nozzle 10 from the upstream side in the conveyance direction. Numbers (e.g., 1, 7, 13, 19 in FIG. 9A) indicated on the right side each indicate that the row of dot data E of the reference mask data U corresponds to what-numbered nozzle 10 from the upstream side in the conveyance direction.

When recording is performed by two successive recording passes based on the mask data as described above, in each line image of the overlap area F, the row of dot data W allocated for each nozzle 10 in one of the successive recording passes and the row of dot data E allocated for each nozzle 10 in the other of the successive recording passes form two rows of dot data E, of the reference mask data U, separated from each other in the Y direction by 12 rows. The line image T is thus completed by causing the thinned-out images recorded by the two recording passes to overlap with each other.

<Effect>

In this embodiment, the controller 50 detects whether the image data of the line image T is present in the recording area $K_{N+1}$ in the order starting from the downstream end in the conveyance direction. When the image data of the line image T is not detected at the upstream end in the conveyance direction of the recording area $K_{N+1}$, the conveyance amount in the N-th conveyance operation is made to be smaller than the predefined amount A by the variation $\Delta A$. Further, the conveyance amount in the [N+1]-th conveyance operation is made to be larger than the predefined conveyance amount A by the variation $\Delta A$.

In the above configuration, when the conveyance amounts in all of the conveyance operations are determined as the predefined conveyance amount A and when the blank portion R where no image is recorded is present at the upstream end of the recording area $K_{N+1}$, the length in the conveyance direction of the overlap area F where the recording area $K_N$ overlaps with the recording area $K_{N+1}$ is lengthened. This reduces or eliminates a white streak and unevenness in concentration at a boundary between the recording area $K_N$ and the recording area $K_{N+1}$ due to variation in conveyance amounts of recording paper P in conveyance operations.

The variation $\Delta A$ is the upper limit value Lm or the length Lr in the conveyance direction between the upstream end of the recording area $K_{N+1}$ and the most upstream position of the recording area $K_{N+1}$ where the image data of the line image T is detected. In both cases, the variation $\Delta A$ is equal to or less than the length Lr. Thus, when the conveyance amount in the N-th conveyance operation is made to be smaller than the predefined conveyance amount A by the variation $\Delta A$ (the length Lr) and when the conveyance amount in the [N+1]-th conveyance operation is made to be larger than the predefined conveyance amount A by the variation $\Delta A$ (the length Lr), it is possible to record the same image as that when the conveyance amount is not changed. In that case, a recording pass count required for image recording is not increased.

Here, in this embodiment, the predefined conveyance amount A corresponds to a length that is shorter than the length Ln of the nozzle row 9 and longer than the length [Ln/2] that is half of the length of the nozzle row 9. In that case, for example, when the conveyance amount in the N-th conveyance operation is determined as the predefined conveyance amount A as depicted in FIGS. 6A and 7A, the recording area $K_N$ partially overlaps with the recording area $K_{N+1}$ (the overlap area F is present). However, when the predefined amount A is too small (the length D is too long), the recording pass for performing recording on the recording paper P is repeated to increase the recording pass count, lengthening the time for image recording. When the predefined conveyance amount A is too large (the length D is too short), the effect of reducing or eliminating a white streak and unevenness in concentration due to variation in conveyance amounts of the recording paper P is reduced.

In this embodiment, as described above, when the image data of the line image is not detected at the upstream end of the recording area $K_{N+1}$, the conveyance amount of the recording paper P in the N-th conveyance operation is made to be smaller than the predefined conveyance amount A. This makes the length in the conveyance direction of the overlap area F where the recording area $K_N$ overlaps with the recording area $K_{N+1}$ longer than the length D. Accordingly, the effect of reducing or eliminating a white streak and unevenness in concentration due to variation in conveyance amounts of the recording paper P in conveyance operations remains high without greatly reducing the predefined conveyance amount A, and the recording pass count required for image recording remains low.

In this embodiment, as described above, the overlap area F is present regardless of whether the image data of the line image T is detected at the upstream end in the conveyance direction of the recording area $K_{N+1}$. In that case, the mask data used to record the thinned-out image when the image data of the line image T is detected at the upstream end in the conveyance direction of the recording area $K_{N+1}$ is different from the mask data used to record the thinned-out image when the image data of the line image T is not detected at the upstream end in the conveyance direction of the recording area $K_{N+1}$. This allows the printer 1 of this embodiment to record the thinned-out images in the overlap area F appropriately.

The length in the conveyance direction of the overlap area F can be lengthened by making the conveyance amount smaller as the length Lr is longer. The effect of reducing or eliminating a white streak and unevenness in concentration due to variation in conveyance amounts of the recording paper P increases as the length in the conveyance direction of the overlap area F is longer. However, if the length in the conveyance direction of the overlap area F is too long, unevenness in concentration due to deviation in the scanning direction of ink landing positions between thinned-out images would be conspicuous. In this embodiment, when the length Lr is equal to or less than the upper limit value Lm, the conveyance amount of the N-th conveyance operation is made to be smaller than the predefined conveyance amount A by the length Lr. When the length Lr exceeds the upper limit value Lm, the conveyance amount of the N-th conveyance operation is made to be smaller than the predefined conveyance amount A by the upper limit value Lm. Accordingly, it is possible to make unevenness in concentration due to deviation in the scanning direction of ink landing positions between thinned-out images inconspicuous, while reducing or eliminating a while streak and unevenness in concentration due to variation in conveyance amounts of the recording paper P.

Deviation in the scanning direction of landing positions of ink discharged from the nozzles 10 between the cases in which the carriage 2 moves rightward and leftward in the scanning direction in the bidirectional recording is likely to be greater than deviation in the scanning direction of landing positions of ink discharged from the nozzles 10 between recording passes in the unidirectional recording. Thus, in this embodiment, the upper limit value Lm for the bidirectional recording mode is made to be smaller than that for the unidirectional recording mode. This allows the unidirectional recording mode to prevent a white streak and unevenness in concentration due to variation in conveyance amounts of the recording paper P. Further, it is possible for the bidirectional recording mode to make unevenness in concentration in the overlap area F due to deviation in the scanning direction of ink landing positions between recording passes inconspicuous as much as possible.

In this embodiment, the reference mask data U when the length in the conveyance direction of the overlap area F is the length [Ln/2] is stored. Then, the mask data portion of the overlap area F is determined by using part of the mask data depending on the length in the conveyance direction of the actual overlap area F, which is shorter than the length [Ln/2]. Accordingly, storing only one kind of reference mask data allows the printer 1 to record the thinned-out image in the overlap area F by use of each piece of mask data depending on the length in the conveyance direction of the overlap area F.

Although the preferred embodiment of the present disclosure is explained above, the present disclosure is not limited to the embodiment. Various modifications can be applied to the embodiment within the appended claims.

In the above embodiment, the upper limit value Lm is changed based on which one of the bidirectional recording mode and the unidirectional recording mode is used. The present disclosure, however, is not limited thereto.

In a first modified embodiment, the printer 1 can perform recording by selecting any of a high-speed recording mode (a second recording mode of the present disclosure) and a high-image-quality recording mode (a first recording mode of the present disclosure). The high-speed recording mode is selected when high speed is required, such as when text recording is performed. The high-image-quality mode is selected when a high image quality is required, such as when photo printing is performed. In order to shorten the time for conveyance operation, acceleration of the conveyance rollers 5 and 6 at the time of start of the conveyance operation and deceleration of the conveyance rollers 5 and 6 immediately before completion of the conveyance operation in the high-speed recording mode are greater than those in the high-image-quality recording mode.

Figure 10A:
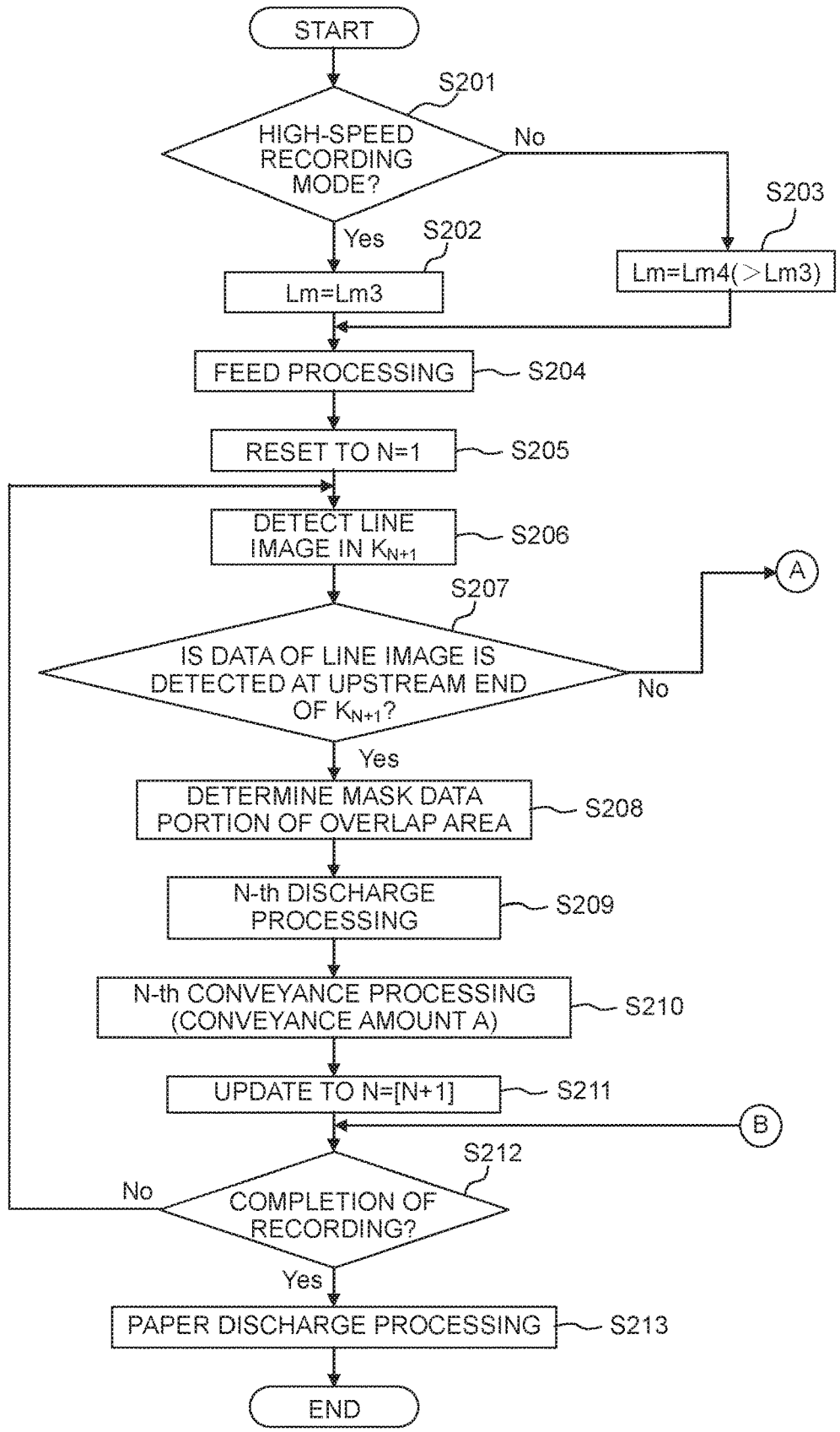

In the first modified embodiment, as indicated in FIGS. 10A and 10B, when recording is performed by the high-speed recording mode (S201: YES), the upper limit value Lm is set as a value Lm3 (S202). When recording is performed by the high-image-quality recording mode, the upper limit value Lm is set as a value Lm4 (<Lm3) (S203). Then, the controller 50 performs pieces of processing of the steps S204 to S224 that are similar to pieces of processing of the steps S104 to S124 according to the above embodiment.

The acceleration at the time of start of the conveyance operation and the deceleration immediately before completion of the conveyance operation in the high-speed recording mode are greater than those in the high-image-quality recording mode. The high-speed recording mode is thus likely to have variation in conveyance amounts of the recording paper P in the conveyance operations. In order to solve that problem, in the present disclosure, the upper limit value Lm for the high-speed recording mode having great variation in conveyance amounts of the recording paper P is made to be greater than the upper limit value Lm for the high-image-quality recording mode having small variation in conveyance amounts of the recording paper P. This makes it possible for the high-speed recording mode to effectively reduce or eliminate a white streak and unevenness in concentration due to variation in conveyance amounts of the recording paper P. In the high-image-quality recording mode, it is possible to make unevenness in concentration in the overlap area F due to deviation in the scanning direction of ink landing positions between recording passes, inconspicuous as much as possible.

In the above embodiment, the upper limit value Lm may be a constant value regardless of whether recording is performed by the bidirectional recording mode or the unidirectional recording mode. Similarly, in the first modified embodiment, the upper limit value Lm may be a constant value regardless of whether recording is performed by the high-speed recording mode or the high-image-quality recording mode.

In the above embodiment, when the length Lr is equal to or less than the upper limit value Lm, the variation ΔA of the conveyance amount is set as the length Lr. When the length Lr exceeds the upper limit value Lm, the variation ΔA of the conveyance amount is set as the upper limit value Lm. The present disclosure, however, is not limited thereto. The variation ΔA of the conveyance amount may be set as the length Lr regardless of the length Lr.

In the above embodiment, when the image data of the line image T is not detected at the upstream end in the conveyance direction of the recording area $K_{N+1}$, only the conveyance amount of the recording paper P in the N-th conveyance operation is made to be small. The present disclosure, however, is not limited thereto.

Figure 11:
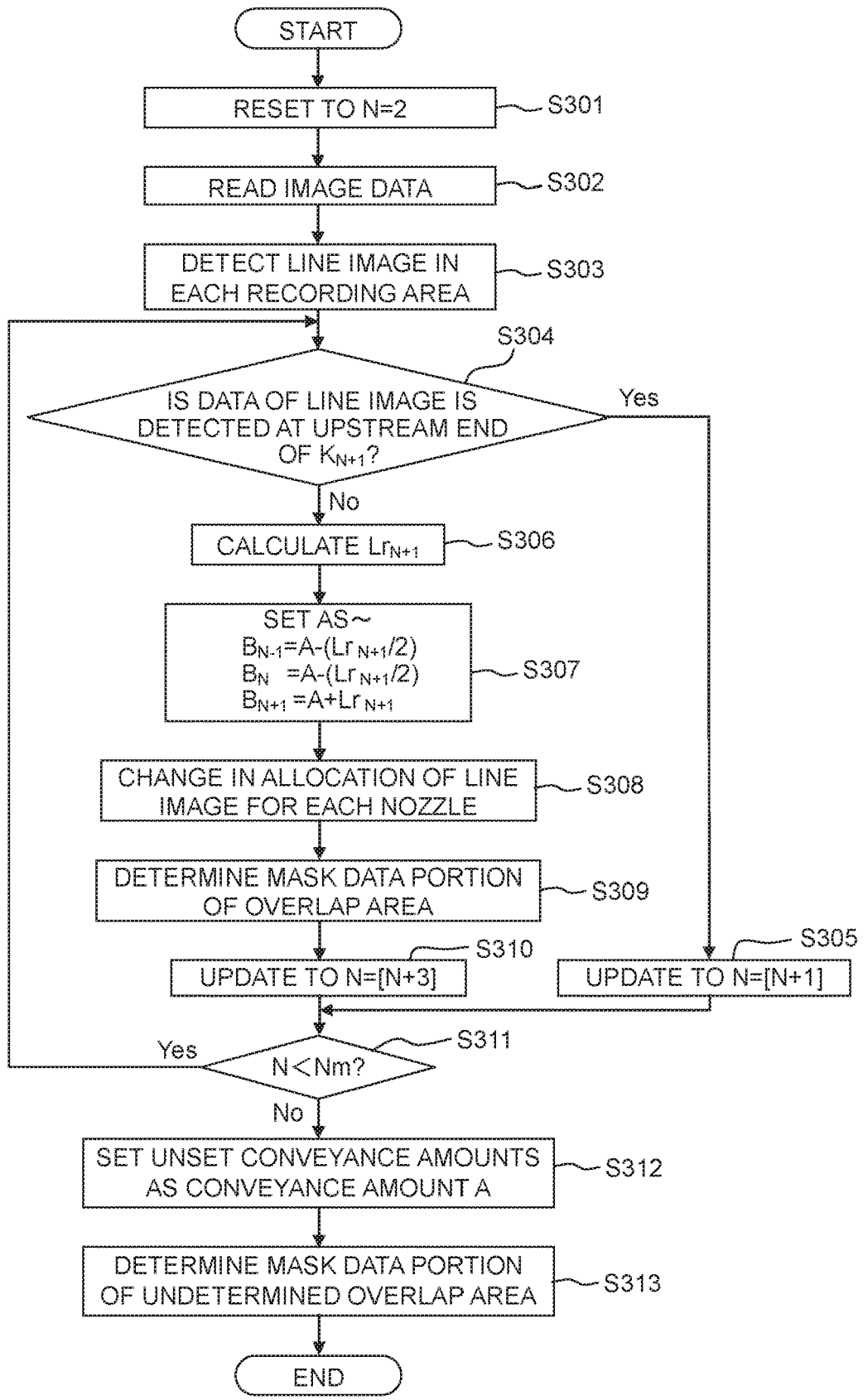
FIG. 11 is a flowchart indicating setting of the conveyance amount in each conveyance operation, change in allocation of the line image for each nozzle in the recording pass, determination of a mask data portion in each overlap area, and other processings according to a second modified embodiment.

In a second modified embodiment, pieces of processing are performed in accordance with the flowchart of FIG. 11 to determine a conveyance amount $B_N$ (N=1, 2, . . . , Nm) of the recording paper P in each conveyance operation, allocate the line image for each nozzle 10 in each recording pass, determine the mask data portion of each overlap area F, and the like. Then, pieces of processing are performed in accordance with the flowchart of FIG. 12. Accordingly, an image is recorded on the recording paper P in the second modified embodiment. $B_N$ is a conveyance amount of the recording paper P in the N-th conveyance operation. Nm is a recording pass count until recording of the image on the recording paper P is completed.

More specifically, as indicated in FIG. 11, the controller 50 at first resets a variable N to two (S301). Then, the controller 50 reads all pieces of image data of the image to be recorded (S302). Then, the controller 50 detects whether the line image T is present in each recording area $K_1$, $K_2$, . . . , $K_{Nm}$ where the image is to be recorded by each recording pass (S303), similar to the step S106 of the above embodiment.

When the controller 50 has detected that the image data of the line image T is present at the upstream end in the conveyance direction of a recording area $K_{N+1}$ (S304: YES), the controller 50 updates N to [N+1] (S305) and proceeds to the step S311.

When the image data of the line image T is not detected at the upstream end in the conveyance direction of the recording area $K_{N+1}$ (S304: NO), a length $Lr_{N+1}$ in the conveyance direction between the upstream end of the recording area $K_{N+1}$ and a most upstream position of the recording area $K_{N+1}$ where the image data of the line image is detected, is calculated (S306). The length $Lr_{N+1}$ is similar to the length Lr of the above embodiment, and the method for calculating the length $Lr_{N+1}$ is similar to the method for calculating the length Lr of the above embodiment.

Subsequently, the controller 50 sets conveyance amounts $B_{N-1}$ and $B_N$ to [A−($Lr_{N+1}$/2)], and sets a conveyance amount $B_{N+1}$ to [A+$Lr_{N+1}$] (S307).

Subsequently, the controller 50 changes allocation of the line image for each nozzle 10 in the [N+1]-th recording pass (S308). Specifically, the controller 50 shifts the line image allocated for each nozzle 10 in each of the N-th recording pass and [N+1]-th recording pass to the upstream side in the conveyance direction by [($Lr_{N+1}$/2)/G].

Subsequently, the controller 50 determines mask data portions of an overlap area $F_{N-1}$ and an overlap area $F_N$ (S309). In the step S309, the controller 50 determines the mask data portions of the overlap areas $F_N$ and $F_{N+1}$ when the length in the conveyance direction of the overlap areas $F_N$ and $F_{N+1}$ is [D+($Lr_{N+1}$/2)]. Then, the controller 50 updates N to [N+3] (S310) and proceeds to the step S311.

In S311, the controller 50 determines whether N is smaller than Nm. When N is smaller than Nm (S311: YES), the controller returns to S304. When N is equal to or more than Nm (S311: NO), all unset conveyance amounts of conveyance amounts $B_1$, $B_2$, . . . , and $B_{Nm}$ in the conveyance operations are set as the predefined conveyance amount A (S312). Then, the controller 50 determines the mask data portion of the overlap area F having an undetermined data portion of mask data (S313). In the step S313, the controller 50 determines the mask data portion of the overlap area F when the length in the conveyance direction of the overlap area F is D.

Figure 12:
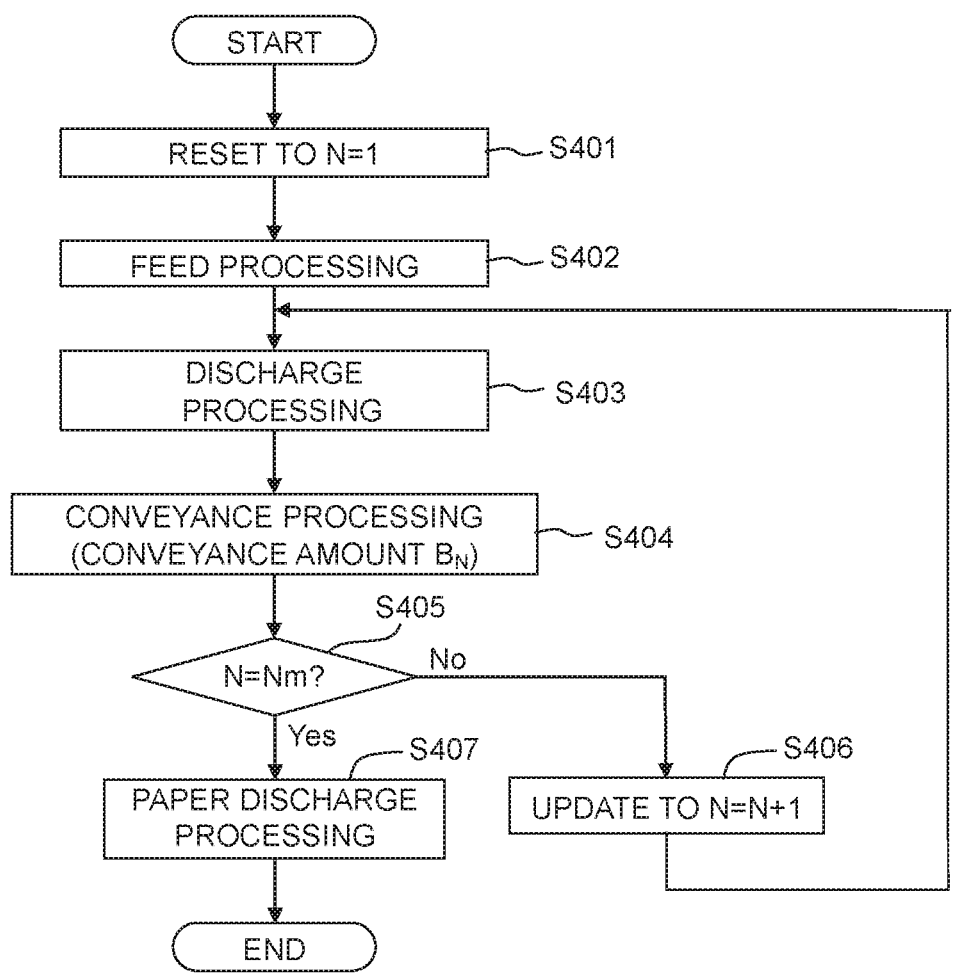
FIG. 12 is a flowchart of recording processing according to the second modified embodiment.

After completion of pieces of processing indicated in FIG. 11, the controller 50 performs pieces of processing in accordance with the flowchart of FIG. 12. More specifically, the controller 50 resets N to one (S401) and performs the feed processing similar to the step S104 (S402). Then, the controller 50 performs the N-th discharge processing (S403). In the step S403, ink is discharged from each nozzle 10 corresponding to an area of the recording area $K_N$ except for the overlap area F so that the line image T allocated for each nozzle 10 is recorded. Meanwhile, ink is discharged from each nozzle 10 corresponding to the overlap area F so that a thinned-out image, in which part of the line image T allocated for each nozzle 10 is thinned out based on mask data, is recorded. Subsequently, the controller 50 performs the N-th conveyance processing (S404). In the step S404, the recording paper P is conveyed by the conveyance amount $B_N$.

When N is less than Nm (S405: YES), the controller 50 updates N to [N+1] (S406) and returns to the step S403. When N is Nm (S405: NO), the controller performs the paper discharge processing (S407) similar to the step S113. Then, the controller 50 ends the series of processing indicated in FIG. 11.

In the above embodiment, unlike the second modified embodiment, when the conveyance amounts of all the conveyance operations are set as the predefined conveyance amount A, and when the image data of the line image is not detected at the upstream end in the conveyance direction of the recording area $K_{N+1}$, the image having the blank portion R as depicted in FIG. 6A is recorded.

Figure 13:
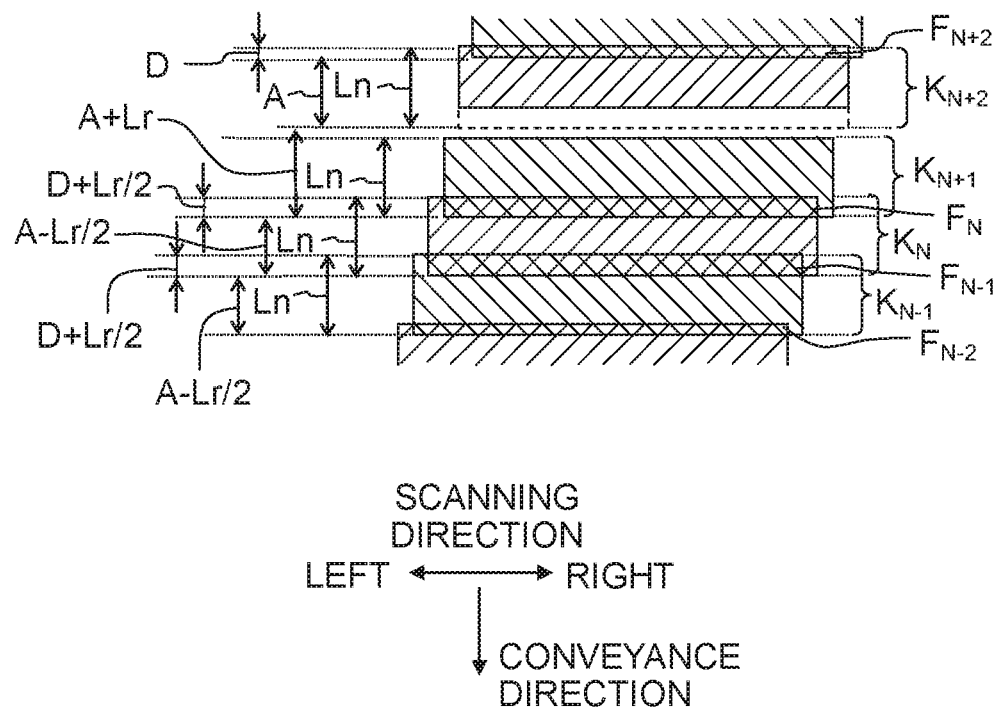
FIG. 13 is a diagram corresponding to FIG. 6B according to the second modified embodiment.

In the second modified embodiment, when the image data of the line image T is not detected at the upstream end in the conveyance direction of the recording area $K_{N+1}$, the conveyance amounts $B_{N-1}$ and $B_N$ of the recording paper P in the [N−1]-th conveyance operation and the N-th conveyance operation are made to be smaller than the predefined conveyance amount A by [$Lr_{N+1}$/2]. Corresponding to this, allocation of the line image for each nozzle 10 is changed in each of the [N−1]-th recording pass, the N-th recording pass, and [N+1]-th recording pass. This lengthens the length in the conveyance direction of each of the overlap areas $F_{N-1}$ and $F_N$ longer than the length D by [$Lr_{N+1}$/2], as depicted in FIG. 13. Further, in that case, the conveyance amount of the recording paper P in the [N+1]th conveyance operation is made to be a conveyance amount [A+Lr] that is larger than the predefined conveyance amount A by the length Lr. This makes the position in the conveyance direction of the recording area $K_{N+2}$ identical to that depicted in FIG. 6A.

In the second modified embodiment, when N≥2 is satisfied and when the image data of the line image is not detected at the upstream end in the conveyance direction of the recording area $K_{N+1}$, conveyance amounts of the recording paper P in two conveyance operations (the [N−1]-th conveyance operation and the N-th conveyance operation) are made to be small. This lengthens lengths in the conveyance direction of the two overlap areas $F_{N-1}$ and $F_N$ to prevent a white streak and unevenness in concentration which may otherwise by caused at a boundary between the recording area $K_{N-1}$ and the recording area $K_N$ and a boundary between the recording area $K_{N-1}$ and the recording area $K_N$ due to variation in conveyance amounts of the recording paper P. The total $(=[Lr_{N+1}/2]+[Lr_{N+1}/2])$ of decrements in conveyance amounts of the recording paper P in the two conveyance operations is the same as the length $Lr_{N+1}$ in the conveyance direction between the upstream end of the recording area $K_{N+1}$ and the most upstream position of the recording area $K_{N+1}$ where the image data of the line image T is detected. Thus, when the conveyance amount of the recording paper P is made to be smaller than the predefined conveyance amount A by $[Lr_{N+1}/2]$ in each of the [N−1]-th conveyance operation and the N-th conveyance operation, and when the conveyance amount of the recording paper P is made to be larger than the predefined conveyance amount A by $Lr_{N+1}$ in the [N+1]-th conveyance operation, the same image as that of when the conveyance amount is not changed, can be recorded. That configuration does not increase the recording pass count required for image recording.

In the second modified embodiment, when the image data of the line image is not detected at the upstream end in the conveyance direction of the recording area $K_{N+1}$, the conveyance amounts $B_{N-1}$ and $B_N$ are always set as $[A-(Lr_{N+1}/2)]$, and the conveyance amount $B_{N+1}$ always set as $[A+Lr_{N+1}]$. The present disclosure, however, is not limited thereto. In the second modified embodiment, similar to the above embodiment, when the image data of the line image is not detected at the upstream end in the conveyance direction of the recording area $K_{N+1}$, and when the length $Lr_{N+1}$ is equal to or less than the upper limit value Lm, the conveyance amounts $B_{N-1}$ and $B_N$ may be set as $[A-(Lr_{N+1}/2)]$ and the conveyance amount $B_{N+1}$ may be set as $[A+Lr_{N+1}]$. When the length $Lr_{N+1}$ exceeds the upper limit value Lm, the conveyance amounts $B_{N-1}$ and $B_N$ may be set as $[A-(Lm/2)]$ and the conveyance amount $B_{N+1}$ may be set as $[A+Lm]$.

In the second modified embodiment, the explanation is made about the case in which lengths in the conveyance direction of the two overlap areas F are lengthened by making the conveyance amounts in two successive conveyance operations small. The present disclosure, however, is not limited thereto. Lengths in the conveyance direction of three or more overlap areas F may be lengthened by making the conveyance amounts in three or more successive conveyance operations small. Or, lengths in the conveyance direction of two or more overlap areas F may be lengthened by making conveyance amounts in two or more conveyance operations, at least some of which are not performed successively, small.

Further, when the conveyance amounts in the two or more conveyance operations are made to be small, the conveyance amount of the recording paper P in each conveyance operation may not be uniformly smaller than the predefined conveyance amount A. How much the conveyance amount of the recording paper P is made to be smaller than the predefined conveyance amount A may depend on each conveyance operation.

In the above embodiment, when the length in the conveyance direction of the overlap area F is the length Lf, the mask data portion of the overlap area F is determined by using rows of dot data E, from among multiple rows of dot data E configuring the reference mask data U, every [(Ln/2)/Lf] row from the upstream side in the conveyance direction. The present disclosure, however, is not limited thereto. The mask data portion of the overlap area F may be determined by using rows of dot data E, from among multiple rows of dot data E configuring the reference mask data U, different from those of the above embodiment.

In the above case, the mask data portion of the overlap area F is required to be determined by using part of the reference mask data U so that two rows of dot data F allocated for the same nozzle 10 in two recording passes correspond to two rows of dot data E separated from each other in the Y direction by 12 rows in the reference mask data U.

In the above embodiment, the reference mask data U, which is a mask data when the length in the conveyance direction of the overlap area F is the length [Ln/2] that is half of the length Ln of the nozzle row 9, is stored, and the mask data portion of the overlap area F is determined by using part of the reference mask data depending on the length of the actual overlap area F. The present disclosure, however, is not limited thereto. For example, mask data (mask data as depicted in FIGS. 9A to 9C) for each length in the conveyance direction of each overlap area F may be stored individually.

In the above embodiment, the predefined conveyance amount A is an amount corresponding to a length that is shorter than the length Ln of the nozzle row 9 and longer than the length [Ln/2], which is half of the length of the nozzle row 9. The present disclosure, however, is not limited thereto.

For example, the predefined conveyance amount A may be an amount corresponding to the same length as the length Ln of the nozzle row 9. In that case, when the image data of the line image T is detected at the upstream end in the conveyance direction of the recording area $K_{N+1}$, the conveyance amount of the recording paper P in the N-th conveyance operation is the same as the length Ln of the nozzle row 9 and the position of the upstream end of the recording area $K_N$ matches the position of the downstream end of the recording area $K_{N+1}$. Thus, the recording area $K_N$ does not overlap with the recording area $K_{N+1}$ (no overlap area F is present). When the image data of the line image T is not detected at the upstream end in the conveyance direction of the recording area $K_{N+1}$, the conveyance amount in the N-th conveyance operation is shorter than the length Ln of the nozzle row 9 and the upstream end of the recording area $K_N$ overlaps with the downstream end of the recording area $K_{N+1}$ (the overlap area F is present).

Alternatively, the predefined conveyance amount A may be an amount corresponding to the length [Ln/2], which is half of the length of the nozzle row 9. In that case, when the image data of the line image T is detected at the upstream end in the conveyance direction of the recording area $K_{N+1}$, the conveyance amount of the recording paper P in the N-th conveyance operation is [Ln/2] and the overlap area is an area where half of the recording area $K_N$ on the upstream side overlaps, in the conveyance direction, with half of the recording area $K_{N+1}$ on the downstream side. The line image is recorded in the overlap area by two recording passes (i.e., the N-th recording pass and the [N+1]-th recording pass). When the image data of the line image T is not detected at the upstream end in the conveyance direction of the recording area $K_{N+1}$, the conveyance amount of the recording paper P in the N-th conveyance operation is smaller than [Ln/2]. This causes part of the overlap area where the recording area $K_N$ overlaps with the recording area $K_{N+1}$ to overlap with the recording area $K_{N-1}$ (N≥2). In that case, the mask data is determined so that the line image is recorded in the overlap area where the three recording areas $K_{N-1}$, $K_N$, and $K_{N+1}$ overlap with each other, by three successive recording passes.

The predefined conveyance amount A may be smaller than the amount corresponding to the length [Ln/2], Which is half of the length of the nozzle row 9. In that case, regardless of whether the image data of the line image T is detected at the upstream end in the conveyance direction of the recording area $K_{N+1}$, three or more recording areas overlap with each other in at least part of the overlap area and the line image is recorded in the area where the three or more recording areas overlap with each other by three successive recording passes.

The explanation is made about an example in which the present disclosure is applied to the printer that performs printing on recording paper P by discharging ink from nozzles. The present disclosure, however, is not limited thereto. The present disclosure can be applied to a liquid discharge apparatus that discharges any other liquid than ink, such as resin or metal in the form of a liquid.

What is claimed is:

1. An image recording apparatus, comprising:
   a conveyer configured to convey a recording medium in a conveyance direction;
   a carriage configured to move in a scanning direction orthogonal to the conveyance direction;
   a recording head carried on the carriage, the recording head including a nozzle row that has a plurality of nozzles aligned in the conveyance direction; and
   a controller configured to control the conveyer, the carriage and the recording head to record an image on the recording medium by alternately performing a recording pass in which liquid is discharged from the nozzles to the recording medium during movement in the scanning direction of the carriage, and a conveyance operation in which the conveyer conveys the recording medium in the conveyance direction,
   wherein in a case of recording the image,
      in a case that the recording medium is conveyed by the conveyance operation and that the recording pass is performed twice successively to record the image on two recording areas of the recording medium such that the two recording areas partially overlap with each other, the controller is configured to control the recording head to record a thinned-out image by recording a line image corresponding to one line that extends in the scanning direction in an overlap area where the two recording areas overlap with each other by use of the nozzles different from each other between the two successive recording passes and causing different parts of the line image to be thinned out based on mask data,
      the controller is configured to detect whether or not image data of the line image is present in the recording area for a next recording pass of a certain recording pass in an order starting from a downstream end in the conveyance direction,
      in a case that the controller has not detected that the image data of the line image is present at an upstream end in the conveyance direction of the recording area for the next recording pass, the controller is configured to make a conveyance amount of the recording medium in the conveyance operation between the certain recording pass and the next recording pass smaller than a case in which the controller has detected that the image data of the line image is present at the upstream end in the conveyance direction of the recording area for the next recording pass, by an amount corresponding to a length in the conveyance direction that is equal to or less than a length between the upstream end of the recording area for the next recording pass and a most upstream position of the recording area where the image data of the line image is detected, and
      the controller is configured control the conveyer, the carriage and the recording head to perform recording on the overlap area corresponding to the certain recording pass and the next recording pass by recording the thinned-out image.

2. The image recording apparatus according to claim 1, wherein, in the case that the controller has detected that the image data of the line image is present at the upstream end in the conveyance direction of the recording area for the next recording pass, the controller is configured to set the conveyance amount of the recording medium in the conveyance operation between the certain recording pass and the next recording pass, as a predefined conveyance amount equal to or less than a length of the nozzle row.

3. The image recording apparatus according to claim 2, wherein the predefined conveyance amount is an amount corresponding to a length that is shorter than the length of the nozzle row and longer than half of the length of the nozzle row, and
   in a case of recording the thinned-out image, the controller is configured to control the recording head to record the thinned-out image in the certain recording pass and the next recording pass based on the mask data used in the case that the controller has detected that the image data of the line image is present at the upstream end in the conveyance direction of the recording area for the next recording pass and the mask data used in the case that the controller has not detected that the image data of the line image is present at the upstream end in the conveyance direction of the recording area for the next recording pass, those pieces of mask data being different from each other.

4. The image recording apparatus according to claim 1, wherein in the case that the controller has not detected that the image data of the line image is present at the upstream end in the conveyance direction of the recording area for the next recording pass, the controller is configured to make the conveyance amount of the recording medium in the conveyance operation between the certain recording pass and the next recording pass, smaller than the case in which the controller has detected that the image data of the line image is present at the upstream end in the conveyance direction of the recording area for the next recording pass, within a range in which a length in the conveyance direction of the overlap area corresponding to the certain recording pass and the next recording pass does not exceed a predefined upper limit value.

5. The image recording apparatus according to claim 4, wherein, in the case of recording the image, the controller is configured to selectively use any of a bidirectional recording mode in which the liquid is discharged from the nozzles both in a case that the carriage moves toward one side in the scanning direction and that the carriage moves toward the other side in the scanning direction, and a unidirectional recording mode in which the liquid is discharged from the nozzles only in the case that the carriage moves toward the one side in the scanning direction, and the upper limit value for the bidirectional recording mode is smaller than the upper limit value for the unidirectional recording mode.

6. The image recording apparatus according to claim 4, wherein, in the case of recording the image, the controller is configured to selectively use any of a first recording mode and a second recording mode having acceleration immediately after the conveyance operation starts and deceleration immediately before the conveyance operation ends that are larger than those of the first recording mode, and the upper limit value for the second recording mode is larger than the upper limit value for the first recording mode.

7. The image recording apparatus according to claim 1, wherein, in the case that the controller has not detected that the image data of the line image is present at the upstream end in the conveyance direction of the recording area for the next recording pass, the controller is configured to make conveyance amounts of the recording medium in at least two conveyance operations that include at least one conveyance operation performed before the certain recording pass and the conveyance operation performed between the certain recording pass and the next recording pass, smaller than the case in which the controller has detected that the image data of the line image is present at the upstream end in the conveyance direction of the recording area for the next recording pass, a total of decrements in the conveyance amounts of the recording medium in the at least two conveyance operations is equal to or less than an amount that corresponds to the length in the conveyance direction between the upstream end of the recording area for the next recording pass and the most upstream position of the recording area where the image data of the line image is detected, and recording on at least two overlap areas is performed by recording the thinned-out image.

8. The image recording apparatus according to claim 1, further comprising a storage configured to store reference mask data that is the mask data in a case that a length in the conveyance direction of the overlap area corresponding to the two successive recording passes is a predefined reference length, wherein, in a case that the thinned-out image is recorded and that the length in the conveyance direction of the overlap area is shorter than predefined reference length, the controller is configured to use a part that is included in the reference mask data and corresponds to the length of the overlap area, as the mask data.

* * * * *